United States Patent
Wada

(10) Patent No.: US 10,778,084 B2
(45) Date of Patent: Sep. 15, 2020

(54) POWER CONVERSION DEVICE, MOTOR DRIVE UNIT, AND ELECTRIC POWER STEERING DEVICE

(71) Applicant: NIDEC CORPORATION, Kyoto-shi Kyoto (JP)

(72) Inventor: Eiji Wada, Kawasaki (JP)

(73) Assignee: NIDEC CORPORATION, Minami-Ku, Kyoto-Shi, Kyoto (JP)

(*) Notice: Subject to any disclaimer, the term of this patent is extended or adjusted under 35 U.S.C. 154(b) by 0 days.

(21) Appl. No.: 16/082,152

(22) PCT Filed: Mar. 1, 2017

(86) PCT No.: PCT/JP2017/008192
§ 371 (c)(1),
(2) Date: Sep. 4, 2018

(87) PCT Pub. No.: WO2017/150641
PCT Pub. Date: Sep. 8, 2017

(65) Prior Publication Data
US 2019/0097522 A1     Mar. 28, 2019

(30) Foreign Application Priority Data
Mar. 4, 2016  (JP) ................. 2016-042741

(51) Int. Cl.
*H02H 7/08* (2006.01)
*H02M 1/32* (2007.01)
(Continued)

(52) U.S. Cl.
CPC ............ *H02M 1/32* (2013.01); *B62D 5/0457* (2013.01); *B62D 5/0463* (2013.01);
(Continued)

(58) Field of Classification Search
CPC .... B60R 16/03; B62D 5/0457; B62D 5/0463; B62D 5/0481; H02M 1/32;
(Continued)

(56) References Cited

U.S. PATENT DOCUMENTS 5,969,919 A    10/1999  Kobayashi et al.
2006/0108957 A1  5/2006  Urakabe et al.
(Continued)

FOREIGN PATENT DOCUMENTS

JP    H1198888 A     4/1999
JP    2006149153 A   6/2006
(Continued)

OTHER PUBLICATIONS

International Search Report corresponding to Application No. PCT/JP2017/008192; dated May 16, 2017.

*Primary Examiner* — Muhammad S Islam
(74) *Attorney, Agent, or Firm* — Cantor Colburn LLP

(57) ABSTRACT

A power conversion device according to an embodiment of the present invention includes a first inverter to which one end of each of n phase windings (n is an integer of three or more) included in an electric motor is coupled, a second inverter to which the other end of each phase winding is coupled, and a switch circuit having at least one of: a first switch element that switches between connection and disconnection of the first inverter and ground, and a second switch element that switches between connection and disconnection of the second inverter and ground.

19 Claims, 24 Drawing Sheets

(51) Int. Cl.

| | |
|---|---|
| *H02P 27/06* | (2006.01) |
| *H02M 7/48* | (2007.01) |
| *H02P 25/18* | (2006.01) |
| *B62D 5/04* | (2006.01) |
| *H02M 7/5387* | (2007.01) |
| *H02P 27/08* | (2006.01) |
| *H02P 29/024* | (2016.01) |
| *B60R 16/03* | (2006.01) |
| *H02M 1/00* | (2006.01) |

(52) U.S. Cl.
CPC ......... *B62D 5/0481* (2013.01); *H02H 7/0833* (2013.01); *H02M 7/48* (2013.01); *H02M 7/53871* (2013.01); *H02P 25/18* (2013.01); *H02P 27/06* (2013.01); *H02P 27/08* (2013.01); *H02P 29/0241* (2016.02); *B60R 16/03* (2013.01); *H02M 2001/0009* (2013.01); *H02M 2001/325* (2013.01); *H02P 2209/01* (2013.01)

(58) Field of Classification Search
CPC ... H02M 2001/0009; H02M 2001/325; H02M 7/48; H02M 7/53871; H02P 2209/01; H02P 25/18; H02P 27/06; H02P 27/08; H02P 29/0241
See application file for complete search history.

(56) References Cited

U.S. PATENT DOCUMENTS

| | | | |
|---|---|---|---|
| 2006/0164027 A1 | 7/2006 | Welchko et al. | |
| 2011/0290580 A1* | 12/2011 | Mukai | B62D 5/04 180/443 |
| 2012/0261207 A1* | 10/2012 | Kawanaka | B62D 5/0484 180/404 |
| 2013/0094266 A1 | 4/2013 | Balpe | |
| 2014/0265959 A1* | 9/2014 | Fuse | B62D 5/0484 318/400.21 |
| 2014/0265965 A1* | 9/2014 | Sakashita | B62D 5/04 318/400.26 |
| 2014/0375238 A1* | 12/2014 | Kurfiss | H02J 7/14 318/400.22 |
| 2016/0134212 A1 | 5/2016 | Kikuchi et al. | |
| 2016/0200355 A1 | 7/2016 | Mori et al. | |

FOREIGN PATENT DOCUMENTS

| | | |
|---|---|---|
| JP | 2006211891 A | 8/2006 |
| JP | 5569626 B1 | 8/2014 |
| JP | 2014192950 A | 10/2014 |
| JP | 2015033269 A | 2/2015 |
| JP | 2015097472 A | 5/2015 |
| JP | 5797751 B2 | 8/2015 |
| JP | 2016019385 A | 2/2016 |

\* cited by examiner

POWER CONVERSION DEVICE, MOTOR DRIVE UNIT, AND ELECTRIC POWER STEERING DEVICE

CROSS REFERENCE TO RELATED APPLICATIONS

This is the U.S. national stage of application No. PCT/JP2017/008192, filed on Mar. 1, 2017. Priority under 35 U.S.C. § 119(a) and 35 U.S.C. § 365(b) is claimed from Japanese Application No. 2016-042741, filed Mar. 4, 2016; the disclosures of which are incorporated herein by reference.

TECHNICAL FIELD

The present disclosure relates to power conversion devices for converting power that is to be supplied to an electric motor, motor drive units, and electric power steering devices.

BACKGROUND

Electric motors (hereinafter simply referred to as "motors") such as brushless DC motors and AC synchronous motors are typically driven by three phase currents. A complicated control technique, such as vector control, is needed to accurately control the waveforms of the three phase currents. Such a control technique requires complicated mathematical calculation and is therefore performed using a digital computation circuit, such as a microcontroller (microcomputer). The vector control technique is utilized in the fields of applications in which the load on a motor varies significantly, such as washing machines, motorized bicycles, electric scooters, electric power steering devices, electric cars, and industrial equipment. Meanwhile, other motor control techniques, such as pulse width modulation (PWM), are employed for motors that have a relatively low output.

In the field of vehicle-mounted devices, an automotive electronic control unit (ECU) is used in a vehicle. The ECU includes a microcontroller, a power supply, an input/output circuit, an A/D converter, a load drive circuit, and a read only memory (ROM), etc. An electronic control system is constructed using the ECU as a main component. For example, the ECU processes a signal from a sensor to control an actuator, such as a motor. More specifically, the ECU controls an inverter in a power conversion device while monitoring the rotational speed or torque of a motor. The power conversion device converts drive power that is to be supplied to the motor, under the control of the ECU.

A mechanically and electronically integrated motor in which a motor, a power conversion device, and an ECU are integrated together has in recent years been developed. In particular, in the field of vehicle-mounted devices, high quality needs to be ensured for safety. Therefore, a fault-tolerant design is employed in order to allow the motor system to continue a safe operation even if some part of the motor system fails. As an example of such a fault-tolerant design, a single motor may be provided with two power conversion devices. As another example, the ECU may be provided with a backup microcontroller in addition to a main microcontroller.

For example, Patent Document No. 1 describes a power conversion device for converting power that is to be supplied to a three-phase motor, the device including a control unit and two inverters. The two inverters are each coupled to a power supply and a ground (hereinafter referred to as a "GND"). One of the two inverters is coupled to one end of each of the three phase windings of the motor, and the other inverter is coupled to the other end of each of the three phase windings. Each inverter includes a bridge circuit that includes three legs each including a high-side switching element and a low-side switching element. The control unit, when detecting a failure in a switching element in the two inverters, switches the control of the motor from control under normal conditions to control under abnormal conditions. As used herein, the term "abnormal conditions" mainly means that a switching element has failed. The term "control under normal conditions" means control that is performed when all the switching elements are operating normally. The term "control under abnormal conditions" means control that is performed in the event of a failure in a switching element.

In the control under abnormal conditions, a neutral point for the windings is formed by turning on and off switching elements according to a predetermined rule in one of the two inverters that includes a switching element that has failed (hereinafter referred to as a "failed inverter"). According to the rule, for example, in the event of an open-circuit failure in which a high-side switching element is always off, the three high-side switching elements other than the failed switching element are turned off, and the three low-side switching elements are turned on, in the bridge circuit of the failed inverter. In this case, the neutral point is formed on the low side. In the event of a short-circuit failure in which a high-side switching element is always on, the three high-side switching elements other than the failed switching element are turned on, and the three low-side switching elements are turned off, in the bridge circuit of the failed inverter. In this case, the neutral point is formed on the high side. In the power conversion device of Patent Document No. 1, the neutral point for the three phase windings is formed in a failed inverter under abnormal conditions. Even in the event of a failure in a switching element, the motor can continue to be driven using one of the inverters that is operating normally.

CITATION LIST

Patent Literature

Patent Document No. 1: Japanese Laid-Open Patent Publication No. 2014-192950

SUMMARY

In the above conventional technique, there has been demand for further improvement in current control under normal and abnormal conditions.

An embodiment of the present disclosure provides a power conversion device that can perform suitable current control under both normal and abnormal conditions.

An example power conversion device according to the present disclosure for converting power that is to be supplied to an electric motor having n phase windings (n is an integer of three or more), comprises a first inverter to which one end of each phase winding of the electric motor is coupled, a second inverter to which the other end of each phase winding is coupled, and a switch circuit having at least one of: a first switch element that switches between connection and disconnection of the first inverter and ground; and a second switch element that switches between connection and disconnection of the second inverter and ground.

Another example power conversion device according to the present disclosure for converting power that is to be supplied to an electric motor having n phase windings (n is an integer of three or more), comprises a first inverter to which one end of each phase winding of the electric motor is coupled, a second inverter to which the other end of each phase winding is coupled, and a switch circuit having at least one of: a first switch element that switches between connection and disconnection of the first inverter and ground; a second switch element that switches between connection and disconnection of the second inverter and ground; a third switch element that switches between connection and disconnection of the first inverter and a power supply; and a fourth switch element that switches between connection and disconnection of the second inverter and the power supply. When the first inverter is not operating normally, a neutral point for the n phase windings is formed in the first inverter.

According to the embodiments of the present disclosure, the inverters can be connected and disconnected to and from at least one of the power supply and the GND. As a result, provided is a power conversion device that can perform suitable current control under both normal and abnormal conditions.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Before describing embodiments of the present disclosure, the present inventor's findings that are the basis of the present disclosure will be described.

In the power conversion device of Patent Document No. 1, the two inverters are each always connected to the power supply and the GND. This configuration does not allow the power supply and the failed inverter to be disconnected from each other. The present inventor has found the problem that even when a neutral point is formed in a failed inverter under abnormal conditions, a current flows from the power supply into the failed inverter. As a result, a power loss occurs in the failed inverter.

As with the power supply, a failed inverter cannot be disconnected from the GND. The present inventor has found the problem that even when a neutral point is formed in a failed inverter under abnormal conditions, a current supplied to each phase winding through an inverter that is operating normally is not returned to that source inverter, and flows to the GND through the failed inverter. In other words, a closed loop of a drive current cannot be formed. It is desirable that a current supplied to each phase winding through an inverter that is operating normally should flow to the GND through that source inverter.

Embodiments of a power conversion device, motor drive unit, and electric power steering device according to the present disclosure will now be described in detail with reference to the accompanying drawings. To avoid unnecessarily obscuring the present disclosure, well-known features may not be described or substantially the same elements may not be redundantly described, for example. This is also for ease of understanding the present disclosure.

Embodiments of the present disclosure are herein described using, as an example, a power conversion device that converts power that is to be supplied to a three-phase motor having three phase (U-phase, V-phase, and W-phase) windings. Note that the present disclosure encompasses a power conversion device that converts power that is to be supplied to an n-phase motor having n phase windings (n is an integer of four or more), such as four phase windings or five phase windings.

First Embodiment

Figure 1:
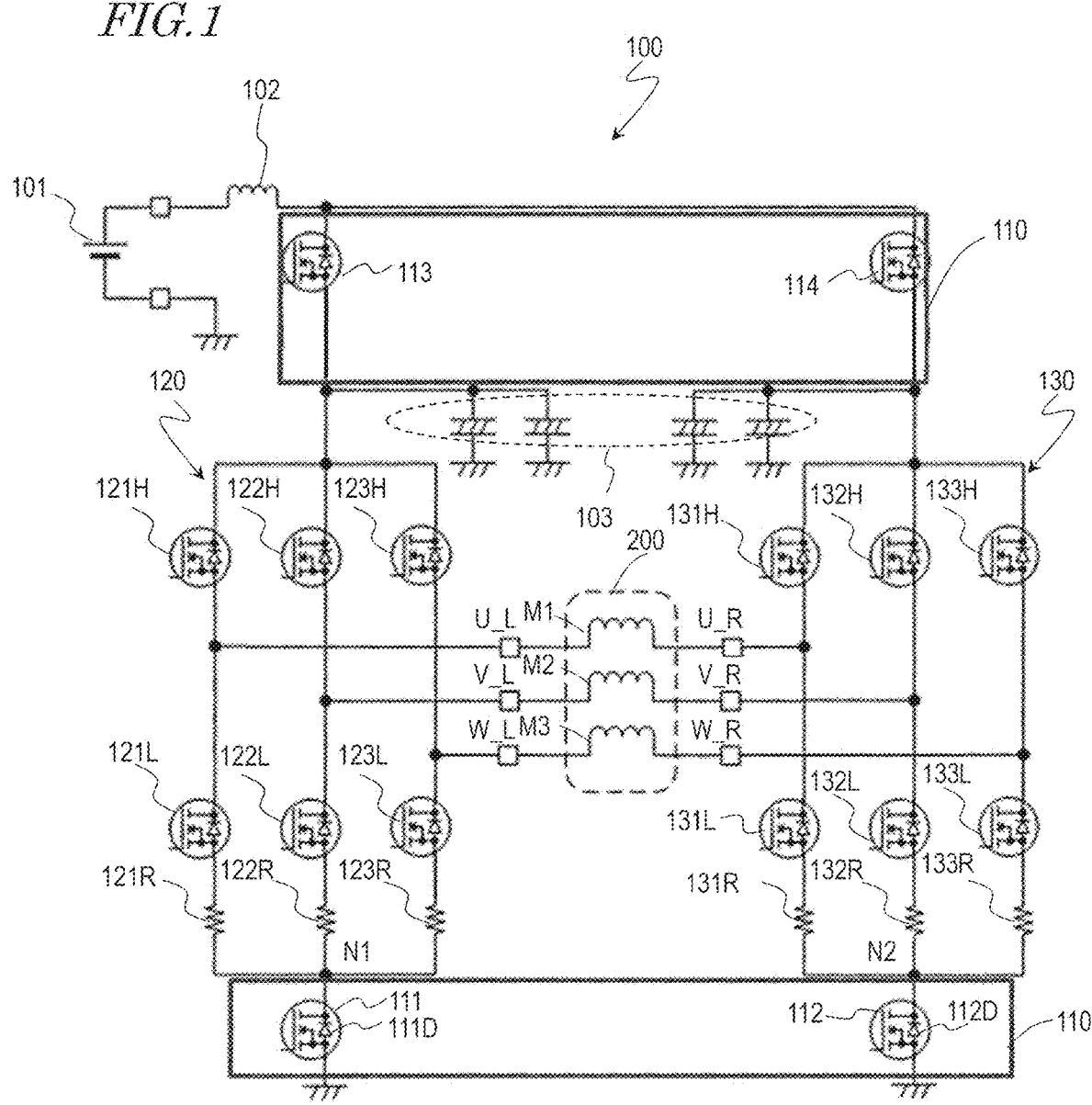
FIG. 1 is a circuit diagram showing a circuit configuration of a power conversion device 100 according to an illustrative first embodiment.

FIG. 1 schematically shows a circuit configuration of a power conversion device 100 according to this embodiment.

The power conversion device 100 includes two switch circuits 110, a first inverter 120, and a second inverter 130. The power conversion device 100 can convert power that is to be supplied to various motors. A motor 200 is a three-phase AC motor.

The motor 200 includes a U-phase winding M1, a V-phase winding M2, and a W-phase winding M3, and is coupled to the first inverter 120 and the second inverter 130. Specifically, the first inverter 120 is coupled to one end of each phase winding of the motor 200, and the second inverter 130 is coupled to the other end of each phase winding. As used herein, the terms "couple" and "connect" with respect to parts (components) mainly means an electrical coupling and connection between the parts. The first inverter 120 has terminals U_L, V_L, and W_L which correspond to the respective phases, and the second inverter 130 has terminals U_R, V_R, and W_R which correspond to the respective phases.

The terminal U_L of the first inverter 120 is coupled to one end of the U-phase winding M1, the terminal V_L is coupled to one end of the V-phase winding M2, and the terminal W_L is coupled to one end of the W-phase winding M3. As with the first inverter 120, the terminal U_R of the second inverter 130 is coupled to the other end of the U-phase winding M1, the terminal V_R is coupled to the other end of the V-phase winding M2, and the terminal W_R is coupled to the other end of the W-phase winding M3. Such coupling with a motor is different from the so-called star or delta coupling.

The two switch circuits 110 have first to fourth switch elements 111, 112, 113, and 114. Of the two switch circuits 110, one that includes the first and second switch elements 111 and 112 and is closer to the GND is hereinafter referred to as a "GND-side switch circuit," and one that includes the third and fourth switch elements 113 and 114 and is closer to the power supply is hereinafter referred to as a "power supply-side switch circuit." In other words, the GND-side switch circuit has the first and second switch elements 111 and 112, and the power supply-side switch circuit has the third and fourth switch elements 113 and 114.

In the power conversion device 100, the first inverter 120 and the second inverter 130 can be electrically connected to the power supply 101 and the GND by the two switch circuits 110.

Specifically, the first switch element 111 connects and disconnects the first inverter 120 to and from the GND. The second switch element 112 connects and disconnects the second inverter 130 to and from the GND. The third switch element 113 connects and disconnects the power supply 101 to and from the first inverter 120. The fourth switch element 114 connects and disconnects the power supply 101 to and from the second inverter 130.

The first to fourth switch elements 111, 112, 113, and 114 may be turned on and off under the control of, for example, a microcontroller or dedicated driver. The first to fourth switch elements 111, 112, 113, and 114 can block a current in the opposite directions. The first to fourth switch elements 111, 112, 113, and 114 may, for example, be a semiconductor switch such as a thyristor or analog switch IC, a mechanical relay, etc. A combination of a diode and an insulated-gate bipolar transistor (IGBT), etc., may be used. Note that the switch elements of the present disclosure include semiconductor switches such as a field-effect transistor in which a parasitic diode is formed (typically a MOSFET). In the description that follows, it is, for example, assumed that the first to fourth switch elements 111, 112, 113, and 114 are a FET, and the first to fourth switch elements 111, 112, 113, and 114 are denoted by FETs 111, 112, 113, and 114, respectively.

The FETs 111 and 112 have parasitic diodes 111D and 112D, respectively, and are disposed such that the parasitic diodes 111D and 112D are directed to the first and second inverters 120 and 130, respectively. More specifically, the FET 111 is disposed such that a forward current flows in the parasitic diode 111D in a direction toward the first inverter 120, and the FET 112 is disposed such that a forward current flows in the parasitic diode 112D in a direction toward the second inverter 130.

The present disclosure is not limited to the examples shown in the drawings. The number of switch elements that are used is determined as appropriate, taking into account design and specifications, etc. In particular, in the field of vehicle-mounted devices, high quality needs to be ensured for safety, and therefore, the power supply-side switch circuit and the GND-side switch circuit may include a plurality of switch elements for each inverter.

Figure 2:
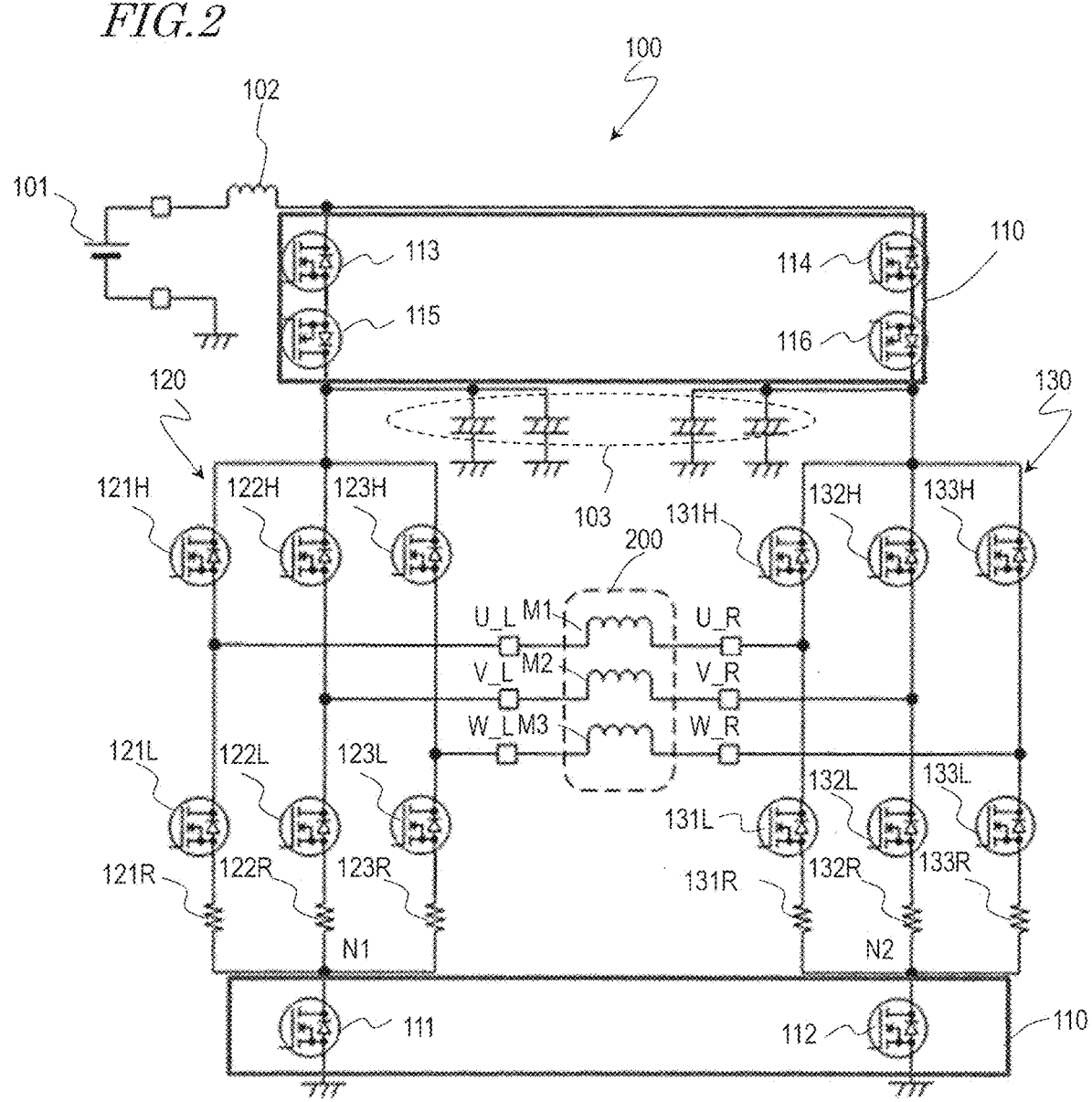
FIG. 2 is a circuit diagram showing another circuit configuration of the power conversion device 100 of the illustrative first embodiment.

FIG. 2 schematically shows another circuit configuration of the power conversion device 100 of this embodiment.

The power supply-side switch circuit 110 may further have a fifth and a sixth switch element (FET) 115 and 116 for reverse connection protection. The FETs 113, 114, 115, and 116, which have a parasitic diode, are disposed such that the directions of the parasitic diodes of the FETs are opposite to each other. Specifically, the FET 113 is disposed such that a forward current flows in the parasitic diode in a direction toward the power supply 101, and the FET 115 is disposed such that a forward current flows in the parasitic diode in a direction toward the first inverter 120. The FET 114 is disposed such that a forward current flows in the parasitic diode in a direction toward the power supply 101, and the FET 116 is disposed such that a forward current flows in the parasitic diode in a direction toward the second inverter 130. Even if the power supply 101 is coupled in the reverse direction, a reverse current can be blocked by the two FETs for reverse connection protection.

The power supply 101 generates a predetermined power supply voltage. The power supply 101 may, for example, be a DC power supply. Note that the power supply 101 may be an AC/DC converter or DC/DC converter, or alternatively, a battery (electric battery).

The power supply 101 may be a single power supply that is shared by the first and second inverters 120 and 130. Alternatively, a first power supply for the first inverter 120 and a second power supply for the second inverter 130 may be provided.

A coil 102 is provided between the power supply 101 and the power supply-side switch circuit 110. The coil 102 functions as a noise filter to perform smoothing so that high-frequency noise contained in a voltage waveform supplied to each inverter or high-frequency noise occurring in each inverter does not flow into the power supply 101. A capacitor or capacitors 103 are coupled to power supply terminals of the inverters. The capacitor 103 is a so-called bypass capacitor, and prevents or reduces voltage ripple. The capacitor 103 is, for example, an electrolytic capacitor. The capacities and number of capacitors 103 that are used are determined as appropriate, taking into account design and specifications, etc.

The first inverter 120 (may also be referred to as a "bridge circuit L") includes a bridge circuit including three legs. Each leg has a low-side switching element and a high-side switching element. Switching elements 121L, 122L, and 123L shown in FIG. 1 are a low-side switching element, and switching elements 121H, 122H, and 123H shown in FIG. 1 are a high-side switching element. The switching elements may, for example, be a FET or IGBT. In the description that follows, it is, for example, assumed that the switching elements are a FET, and may be denoted by FETs. For example, the switching elements 121L, 122L, and 123L are denoted by FETs 121L, 122L, and 123L.

Figure 5:
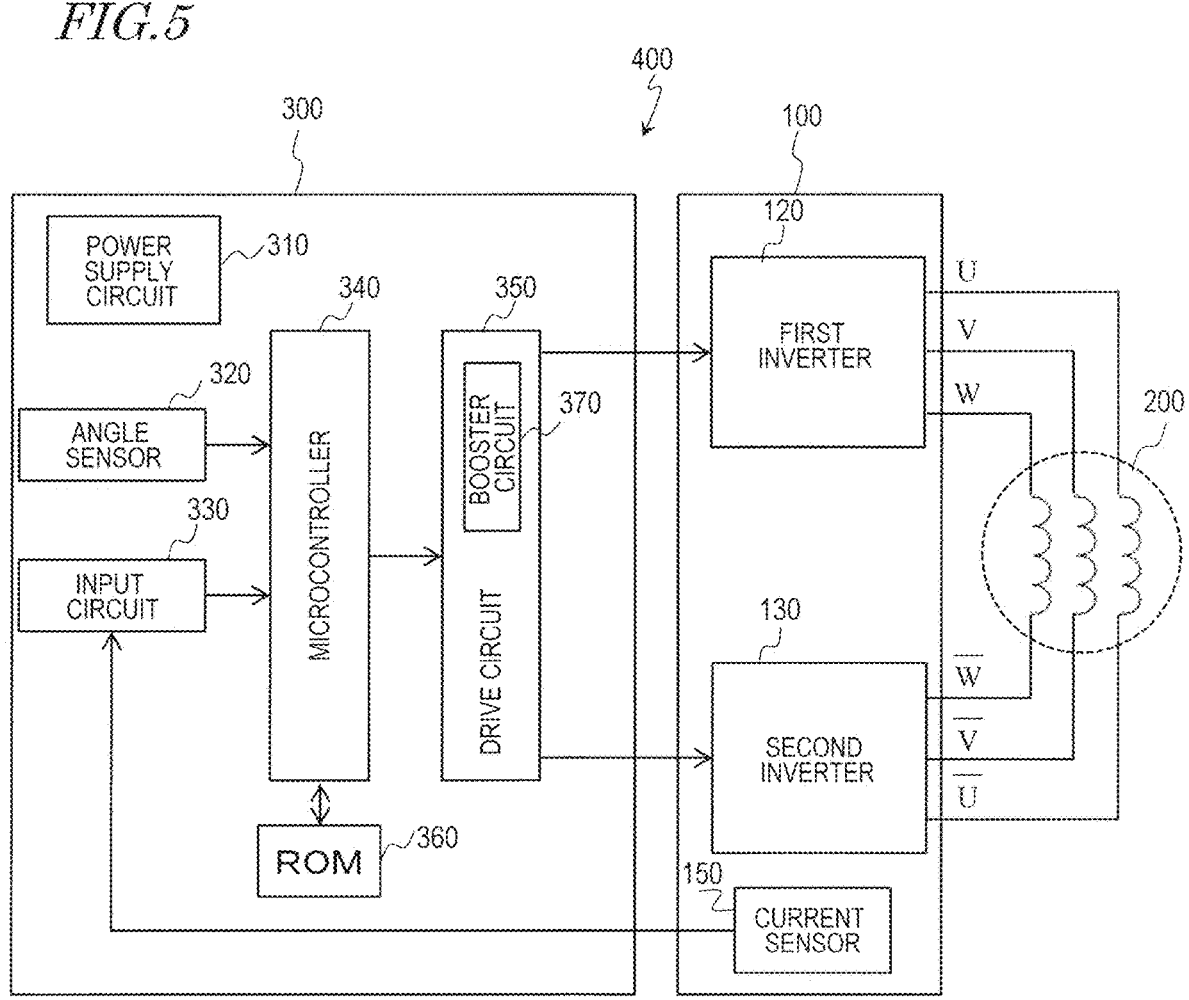
FIG. 5 is a block diagram showing a typical configuration of a motor drive unit 400 including the power conversion device 100.

The first inverter 120 includes three shunt resistors 121R, 122R, and 123R as a current sensor for detecting currents flowing through the U-phase, V-phase, and W-phase windings, respectively (see FIG. 5). The current sensor 150 includes a current detection circuit (not shown) for detecting a current flowing through each shunt resistor. For example, the shunt resistors 121R, 122R, and 123R are each coupled between the corresponding one of the three low-side switching elements included in the three legs of the first inverter 120, and the ground. Specifically, the shunt resistor 121R is electrically connected between the FET 121L and the FET 111, the shunt resistor 122R is electrically connected between the FET 122L and the FET 111, and the shunt resistor 123R is electrically connected between the FET 123L and the FET 111. The shunt resistors have a resistance value of, for example, about 0.5-1.0 mΩ.

As with the first inverter 120, the second inverter 130 (may be denoted by a "bridge circuit R") includes a bridge circuit including three legs. FETs 131L, 132L, and 133L shown in FIG. 1 are a low-side switching element, and FETs 131H, 132H, and 133H are a high-side switching element. The second inverter 130 also includes three shunt resistors 131R, 132R, and 133R. The shunt resistors are coupled between the three low-side switching elements included in the three legs, and the ground. Each of the FETs included in the first and second inverters 120 and 130 may be controlled by, for example, a microcontroller or dedicated driver.

In the example configuration of FIG. 1, a shunt resistor is provided in each leg of each inverter. Note that the first and second inverters 120 and 130 can include six or less shunt resistors. For example, the six or less shunt resistors can be coupled between the six or less low-side switching elements of the six legs of the first and second inverters 120 and 130, and the GND. In the case where this configuration is extended to an n-phase motor, the first and second inverters 120 and 130 can include 2n or less shunt resistors. For example, the 2n or less shunt resistors can be coupled between the 2n or less low-side switching elements of the 2n legs of the first and second inverters 120 and 130, and the GND.

Figure 3:
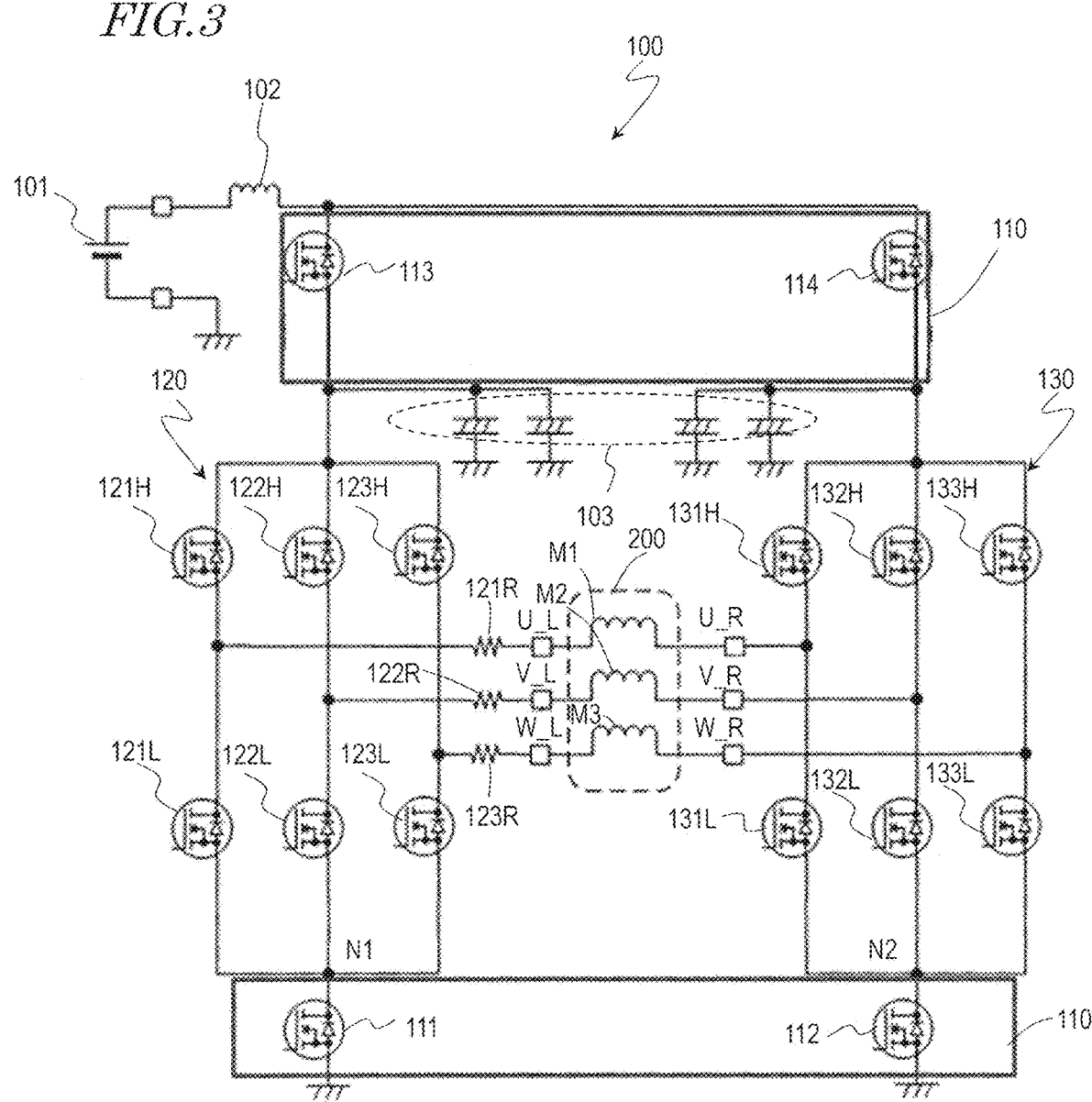
FIG. 3 is a circuit diagram showing still another circuit configuration of the power conversion device 100 of the illustrative first embodiment.
Figure 4:
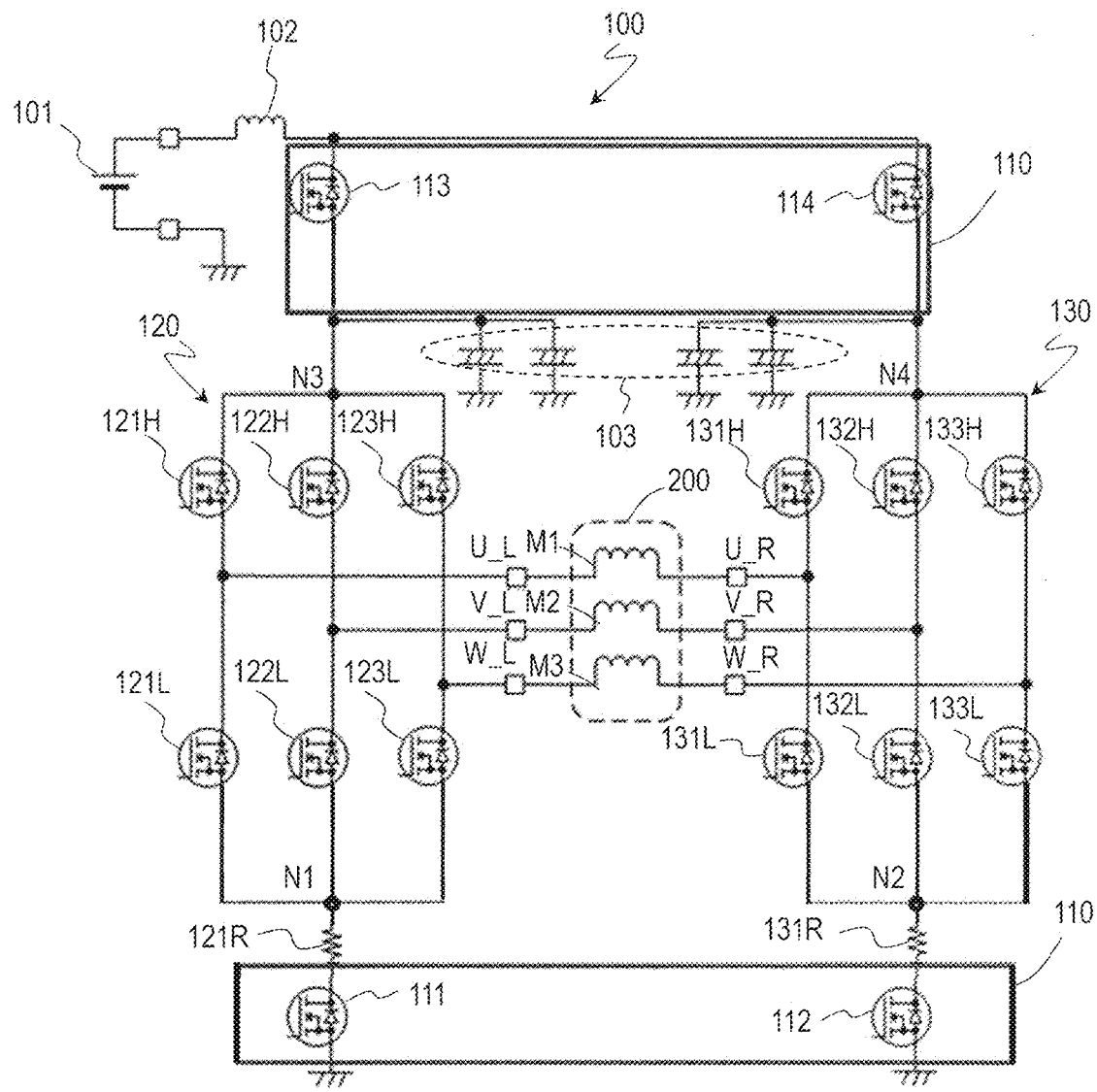
FIG. 4 is a circuit diagram showing still another circuit configuration of the power conversion device 100 of the illustrative first embodiment.

FIGS. 3 and 4 schematically show other circuit configurations of the power conversion device 100 of this embodiment.

As shown in FIG. 3, three shunt resistors can be disposed between the legs of the first or second inverter 120 or 130 and the windings M1, M2, and M3. For example, shunt resistors 121R, 122R, and 123R may be disposed between the first inverter 120 and the one ends of the windings M1, M2, and M3. Alternatively, for example, although not shown, shunt resistors 121R and 122R may be disposed between the first inverter 120 and the one ends of windings M1 and M2, and a shunt resistor 123R may be disposed between the second inverter 130 and the other end of the winding M3. In such a configuration, it is sufficient to dispose three shunt resistors for the U-, V-, and W-phases, and at least two shunt resistors are provided.

As shown in FIG. 4, for example, a single shunt resistor may be provided in each inverter and shared by the phase windings. A single shunt resistor may, for example, be electrically connected between a low-side node N1 (coupling point of the legs) of the first inverter 120, and the FET 111, and another single shunt resistor may, for example, be electrically connected between a low-side node N2 of the second inverter 130, and the FET 112.

As with the low side, a single shunt resistor is, for example, electrically connected between a high-side node N3 of the first inverter 120, and the FET 113, and another single shunt resistor is, for example, electrically connected between a high-side node N4 of the second inverter 130, and the FET 114. Thus, the number of shunt resistors that are used, and the arrangement of the shunt resistors, are determined as appropriate, taking into account manufacturing cost, design, specifications, etc.

FIG. 5 schematically shows a typical block configuration of a motor drive unit 400 that includes the power conversion device 100.

The motor drive unit 400 includes the power conversion device 100, the motor 200, and a control circuit 300.

The control circuit 300 includes, for example, a power supply circuit 310, an angle sensor 320, an input circuit 330, a microcontroller 340, a drive circuit 350, and a ROM 360. The control circuit 300 is coupled to the power conversion device 100, and controls the power conversion device 100 to drive the motor 200.

Specifically, the control circuit 300 controls the rotor such that the rotor takes a desired position, rotational speed, and current, etc., and can achieve closed-loop control. Note that the control circuit 300 may include a torque sensor instead of the angle sensor. In this case, the control circuit 300 can control the rotor such that the rotor takes a desired motor torque.

The power supply circuit 310 generates a DC voltage (e.g., 3 V or 5 V) used for the circuit blocks. The angle sensor 320 is, for example, a resolver or Hall IC. The angle sensor 320 detects the angle of rotation of the rotor of the motor 200 (hereinafter referred to as a "rotation signal"), and outputs the rotation signal to the microcontroller 340. The input circuit 330 receives a motor current value (hereinafter referred to as an "actual current value") detected by the current sensor 150, and if necessary, converts the level of the actual current value into an input level of the microcontroller 340, and outputs the resultant actual current value to the microcontroller 340.

The microcontroller 340 controls the switching operation (turning-on or turning-off) of each FET in the first and second inverters 120 and 130 of the power conversion device 100. The microcontroller 340 calculates a desired current value on the basis of the actual current value and the rotor rotation signal, etc., to generate a PWM signal, and outputs the PWM signal to the drive circuit 350. The microcontroller 340 can also control the on/off operation of each FET in the two switch circuits 110 of the power conversion device 100.

The drive circuit 350 is typically a gate driver. The drive circuit 350 generates control signals (gate control signals) for controlling the switching operations of the respective FETs in the first and second inverters 120 and 130, on the basis of the PWM signal, and outputs the control signals to the gates of the respective FETs. The drive circuit 350 also generates control signals (gate control signals) for controlling the on/off operations of the respective FETs in the two switch circuits 110 according to an instruction from the microcontroller 340, and outputs the control signals to the gates of the respective FETs.

The drive circuit 350 includes a booster circuit 370. The booster circuit 370 boosts a voltage supplied from the power supply 101. For example, in the case where the output voltage of the power supply 101 is 12 V, the booster circuit 370 boosts the voltage to 18 V or 24 V. The boosted voltage may be used to control the switching operation of each FET in the first and second inverters 120 and 130, or control the on/off operation of each FET in the two switch circuits 110. The drive circuit 350 may employ either the charge pump technology or the bootstrapping technology. The booster circuit 370 may employ the charge pump technology.

Note that the microcontroller 340 may control each FET in the two switch circuits 110. Note that the microcontroller 340 may also function as the drive circuit 350. In this case, the control circuit 300 may not include the drive circuit 350.

The ROM 360 is, for example, a writable memory, rewritable memory, or read-only memory. The ROM 360 stores a control program including instructions to cause the microcontroller 340 to control the power conversion device 100. For example, the control program is temporarily loaded to a RAM (not shown) during booting.

The power conversion device 100 performs control under normal conditions and control under abnormal conditions. The control circuit 300 (mainly the microcontroller 340) can switch the control of the power conversion device 100 from the control under normal conditions to the control under abnormal conditions. The on/off-state of each FET in the two switch circuits 110 is determined on the basis of a pattern of a failed FET or FETs (hereinafter also referred to as a "failure pattern"). The on/off-state of each FET in a failed inverter is also determined.

(1. Control Under Normal Conditions)

Firstly, a specific example method for controlling the power conversion device 100 under normal conditions will be described. As described above, the term "normal conditions" means that none of the FETs in the first and second inverters 120 and 130 has failed, and none of the FETs of the two switch circuits 110 has failed.

Under normal conditions, the control circuit 300 turns on all the FETs 111, 112, 113, and 114 of the two switch circuits 110. As a result, the power supply 101 and the first inverter 120 are electrically connected together, and the power supply 101 and the second inverter 130 are electrically connected together. In addition, the first inverter 120 and the GND are electrically connected together, and the second inverter 130 and the GND are electrically connected together. In this connection state, the control circuit 300 performs three-phase conduction control using both of the first and second inverters 120 and 130 to drive the motor 200. Specifically, the control circuit 300 performs the three-phase conduction control by performing switching control on the FETs of the first inverter 120 and the FETs of the second inverter 130 using opposite phases (phase difference=180°). For example, in the case of an H-bridge including the FETs 121L, 121H, 131L, and 131H, when the FET 121L is turned on, the FET 131L is turned off, and when the FET 121L is turned off, the FET 131L is turned on. Similarly, when the FET 121H is turned on, the FET 131H is turned off, and when the FET 121H is turned off, the FET 131H is turned on. A current output from the power supply 101 flows through a high-side switching element, a winding, and a low-side switching element to the GND.

Figure 6:
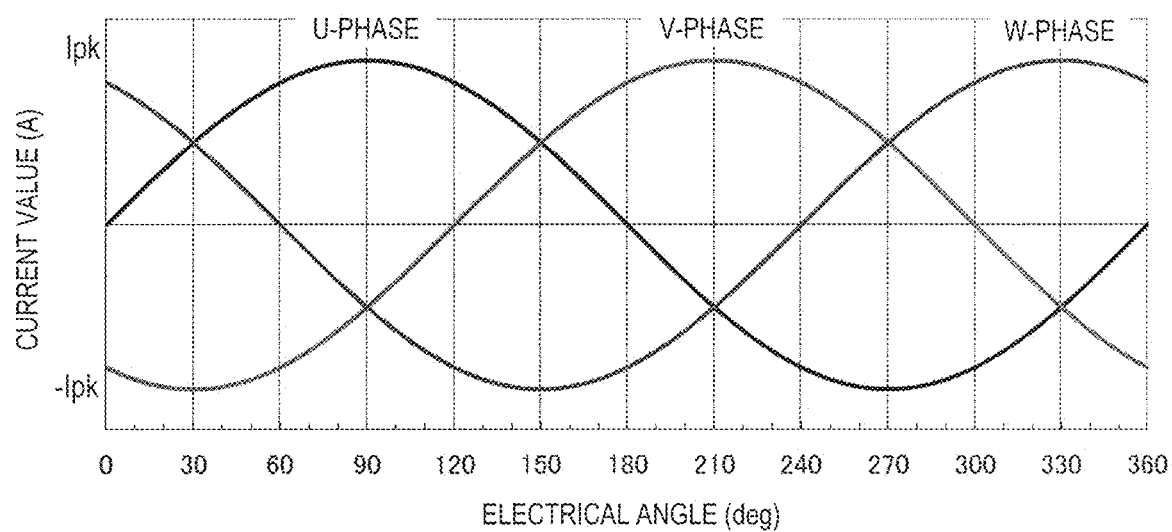
FIG. 6 is a diagram showing current waveforms (sine waves) that are obtained by plotting values of currents flowing through a U-phase, a V-phase, and a W-phase winding of a motor 200 when the power conversion device 100 is controlled by three-phase conduction control.

FIG. 6 shows example current waveforms (sine waves) that are obtained by plotting values of currents flowing through the U-phase, V-phase, and W-phase windings of the motor 200 when the power conversion device 100 is controlled by the three-phase conduction control. The horizontal axis represents motor electrical angles (deg), and the vertical axis represents current values (A). In the current waveforms of FIG. 6, current values are plotted every electrical angle of 30°. $I_{pk}$ represents the greatest current value (peak current value) of each phase.

Table 1 shows the values of currents flowing through the terminals of each inverter every predetermined electrical angle of the sine waves of FIG. 6. Specifically, Table 1 shows the values of currents flowing through the terminals U_L, V_L, and W_L of the first inverter 120 (the bridge circuit L) every electrical angle of 30°, and the values of currents flowing through the terminals U_R, V_R, and W_R of the second inverter 130 (the bridge circuit R) every electrical angle of 30°. Here, a positive current direction with respect to the bridge circuit L is defined as a direction in which a current flows from a terminal of the bridge circuit L to a terminal of the bridge circuit R. This definition applies to current directions shown in FIG. 6. A positive current direction with respect to the bridge circuit R is defined as a direction in which a current flows from a terminal of the bridge circuit R to a terminal of the bridge circuit L. Therefore, there is a phase difference of 180° between the current in the bridge circuit L and the current in the bridge circuit R. In Table 1, the magnitude of a current value $I_1$ is $[(3)^{1/2}/2]*I_{pk}$, and the magnitude of a current value $I_2$ is $I_{pk}/2$.

TABLE 1

| Operation | | Electrical angles [deg] | | | | | | | | | | | |
|---|---|---|---|---|---|---|---|---|---|---|---|---|---|
| under normal conditions | | 0 (360) | 30 | 60 | 90 | 120 | 150 | 180 | 210 | 240 | 270 | 300 | 330 |
| Bridge circuit L | U_L phase | 0 | $I_2$ | $I_1$ | $I_{pk}$ | $I_1$ | $I_2$ | 0 | $-I_2$ | $-I_1$ | $-I_{pk}$ | $-I_1$ | $-I_2$ |
| | V_L phase | $-I_1$ | $-I_{pk}$ | $-I_1$ | $-I_2$ | 0 | $I_2$ | $I_1$ | $I_{pk}$ | $I_1$ | $I_2$ | 0 | $-I_2$ |
| | W_L phase | $I_1$ | $I_2$ | 0 | $-I_2$ | $-I_1$ | $-I_{pk}$ | $-I_1$ | $-I_2$ | 0 | $I_2$ | $I_1$ | $I_{pk}$ |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

At an electrical angle of 0°, a current does not flow through the U-phase winding M1. A current having a magnitude of $I_1$ flows through the V-phase winding M2 from the bridge circuit R to the bridge circuit L, and a current having a magnitude of $I_1$ flows through the W-phase winding M3 from the bridge circuit L to the bridge circuit R.

At an electrical angle of 30°, a current having a magnitude of $I_2$ flows through the U-phase winding M1 from the bridge circuit L to the bridge circuit R, a current having a magnitude of $I_{pk}$ flows through the V-phase winding M2 from the bridge circuit R to the bridge circuit L, and a current having a magnitude of $I_2$ flows through the W-phase winding M3 from the bridge circuit L to the bridge circuit R.

At an electrical angle of 60°, a current having a magnitude of $I_1$ flows through the U-phase winding M1 from the bridge circuit L to the bridge circuit R, and a current having a magnitude of $I_1$ flows through the V-phase winding M2 from the bridge circuit R to the bridge circuit L. A current does not flow through the W-phase winding M3.

At an electrical angle of 90°, a current having a magnitude of $I_{pk}$ flows through the U-phase winding M1 from the bridge circuit L to the bridge circuit R, a current having a magnitude of $I_2$ flows through the V-phase winding M2 from the bridge circuit R to the bridge circuit L, and a current having a magnitude of $I_2$ flows through the W-phase winding M3 from the bridge circuit R to the bridge circuit L.

At an electrical angle of 120°, a current having a magnitude of $I_1$ flows through the U-phase winding M1 from the bridge circuit L to the bridge circuit R, and a current having a magnitude of $I_1$ flows through the W-phase winding M3 from the bridge circuit R to the bridge circuit L. A current does not flow through the V-phase winding M2.

At an electrical angle of 150°, a current having a magnitude of $I_2$ flows through the U-phase winding M1 from the bridge circuit L to the bridge circuit R, a current having a magnitude of $I_2$ flows through the V-phase winding M2 from the bridge circuit L to the bridge circuit R, and a current having a magnitude of $I_{pk}$ flows through the W-phase winding M3 from the bridge circuit R to the bridge circuit L.

At an electrical angle of 180°, a current does not flow through the U-phase winding M1. A current having a magnitude of $I_1$ flows through the V-phase winding M2 from the bridge circuit L to the bridge circuit R, and a current having a magnitude of $I_1$ flows through the W-phase winding M3 from the bridge circuit R to the bridge circuit L.

At an electrical angle of 210°, a current having a magnitude of $I_2$ flows through the U-phase winding M1 from the bridge circuit R to the bridge circuit L, and a current having a magnitude of $I_{pk}$ flows through the V-phase winding M2 from the bridge circuit L to the bridge circuit R, and a current having a magnitude of $I_2$ flows through the W-phase winding M3 from the bridge circuit R to the bridge circuit L.

At an electrical angle of 240°, a current having a magnitude of $I_1$ flows through the U-phase winding M1 from the bridge circuit R to the bridge circuit L, and a current having a magnitude of $I_1$ flows through the V-phase winding M2 from the bridge circuit L to the bridge circuit R. A current does not flow through the W-phase winding M3.

At an electrical angle of 270°, a current having a magnitude of $I_{pk}$ flows through the U-phase winding M1 from the bridge circuit R to the bridge circuit L, a current having a magnitude of $I_2$ flows through the V-phase winding M2 from the bridge circuit L to the bridge circuit R, and a current having a magnitude of $I_2$ flows through the W-phase winding M3 from the bridge circuit L to the bridge circuit R.

At an electrical angle of 300°, a current having a magnitude of $I_1$ flows through the U-phase winding M1 from the bridge circuit R to the bridge circuit L, and a current having a magnitude of $I_1$ flows through the W-phase winding M3 from the bridge circuit L to the bridge circuit R. A current does not flow through the V-phase winding M2.

At an electrical angle of 330°, a current having a magnitude of $I_2$ flows through the U-phase winding M1 from the bridge circuit R to the bridge circuit L, a current having a magnitude of $I_2$ flows through the V-phase winding M2 from the bridge circuit R to the bridge circuit L, and a current having a magnitude of $I_{pk}$ flows through the W-phase winding M3 from the bridge circuit L to the bridge circuit R.

In the three-phase conduction control, the sum of currents flowing through the three phase windings is invariably "0" at any electrical angle, where the directions of currents are taken into account. For example, the control circuit 300 controls the switching operations of the FETs of the bridge circuits L and R by PWM control such that the current waveforms of FIG. 6 are obtained.

(2. Control Under Abnormal Conditions)

As described above, the term "abnormal conditions" mainly means that a FET(s) has failed. Failures of a FET are roughly divided into an "open-circuit failure" and a "short-circuit failure." The "open-circuit failure" with respect to a FET means that there is an open circuit between the source and drain of the FET (in other words, a resistance rds between the source and drain has a high impedance). The "short-circuit failure" with respect to a FET means that there is a short circuit between the source and drain of the FET.

Referring back to FIG. 1, it is considered that, during the operation of the power conversion device 100, a random failure occurs in which one of the 16 FETs randomly fails.

The present disclosure is mainly directed to a method for controlling the power conversion device 100 when a random failure has occurred. Note that the present disclosure is also directed to a method for controlling the power conversion device 100 when multiple FETs have failed together, etc. Such a multi-failure means that, for example, a failure occurs in the high-side and low-side switching elements of one leg simultaneously.

When the power conversion device 100 is used for a long period of time, a random failure is likely to occur. Note that the random failure is different from the manufacture failure that may occur during manufacture. When even one of the FETs of the two inverters fails, the normal three-phase conduction control can be no longer carried out.

A failure may be detected as follows, for example. The drive circuit 350 monitors the drain-source voltage Vds of a FET, and compares Vds with a predetermined threshold voltage, in order to detect a failure in the FET. The threshold voltage is set in the drive circuit 350 by, for example, data communication with an external IC (not shown), and an external part. The drive circuit 350 is coupled to a port of the microcontroller 340, and sends a failure detection signal to the microcontroller 340. For example, the drive circuit 350, when detecting a failure in a FET, asserts the failure detection signal. The microcontroller 340, when receiving an asserted failure detection signal, reads internal data from the drive circuit 350, and determines which of the FETs has failed.

Alternatively, a failure may be detected as follows, for example. The microcontroller 340 can detect a failure in a FET on the basis of a difference between an actual current value of the motor and a desired current value. Note that the failure detection is not limited to these techniques, and may be performed using a wide variety of known techniques related to the failure detection.

The microcontroller 340, when receiving an asserted failure detection signal, switches the control of the power conversion device 100 from the control under normal conditions to the control under abnormal conditions. For example, a timing at which the control of the power conversion device 100 is switched from the control under normal conditions to the control under abnormal conditions is about 10-30 msec after the assertion of a failure detection signal.

The failure of the power conversion device 100 includes various failure patterns. Failure patterns will now be classified, and the control under abnormal conditions of the power conversion device 100 will now be described in detail for each pattern. In this embodiment, of the two inverters, the first inverter 120 is assumed to be a failed inverter, and the second inverter 130 is assumed to be operating normally.

(2-1. High-Side Switching Element Open-Circuit Failure)

The control under abnormal conditions will be described that is performed in the event of an open-circuit failure in one of the three high-side switching elements in the bridge circuit of the first inverter 120.

It is assumed that, of the high-side switching elements (the FETs 121H, 122H, and 123H) of the first inverter 120, an open-circuit failure has occurred in the FET 121H. Note that, in the event of an open-circuit failure in the FET 122H or 123H, the power conversion device 100 can also be controlled by a control method described below.

In the event of an open-circuit failure in the FET 121H, the control circuit 300 puts the FETs 111, 112, 113, and 114 of the two switch circuits 110 and the FETs 122H, 123H, 121L, 122L, and 123L of the first inverter 120 into a first state. In the first state, the FETs 111 and 113 are off and the FETs 112 and 114 are on in the two switch circuits 110. In addition, the FETs 122H and 123H other than the failed FET 121H (the high-side switching elements other than the failed FET 121H) are off and the FETs 121L, 122L, and 123L are on in the first inverter 120.

In the first state, the first inverter 120 is electrically disconnected from the power supply 101 and the GND, and the second inverter 130 is electrically connected to the power supply 101 and the GND. In other words, when the first inverter 120 is not operating normally, the FET 113 breaks the connection between the power supply 101 and the first inverter 120, and the FET 111 breaks the connection between the first inverter 120 and the GND. In addition, all the three low-side switching elements are turned on so that the low-side node N1 functions as a neutral point for the windings. As used herein, the term "a neutral point is formed" means that a certain node functions as the neutral point. The power conversion device 100 drives the motor 200 using a neutral point that is formed on the low side of the first inverter 120, and the second inverter 130.

Figure 7:
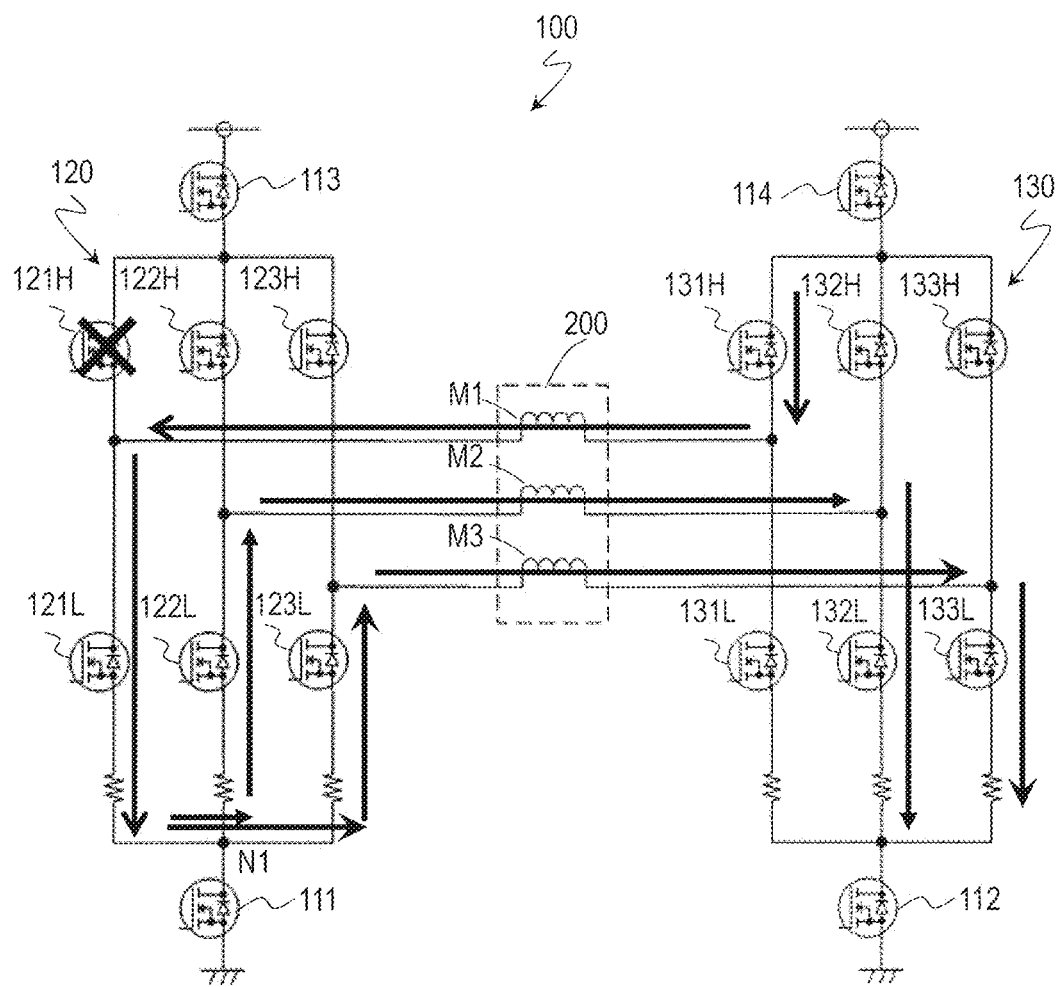
FIG. 7 is a schematic diagram showing flows of currents in the power conversion device 100 that occur when the FETs of two switch circuits 110 and a first inverter 120 are in a first state.
Figure 8:
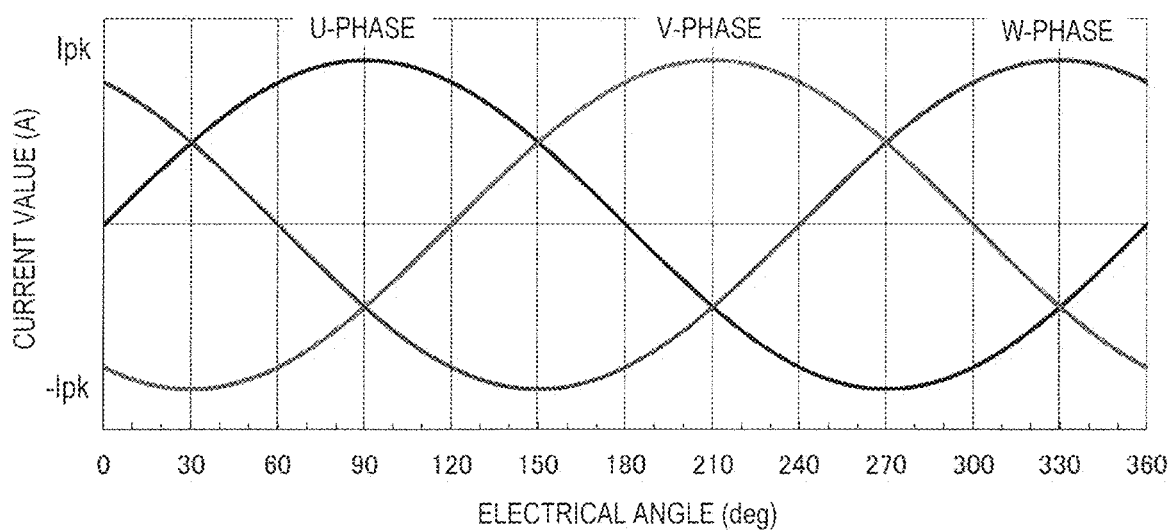
FIG. 8 is a diagram showing current waveforms that are obtained by plotting values of currents flowing through the U-phase, V-phase, and W-phase winding of the motor 200 when the power conversion device 100 is controlled in the first state.

FIG. 7 schematically shows flows of currents in the power conversion device 100 that occur when the FETs of the two switch circuits 110 and the first inverter 120 are in the first state. FIG. 8 shows example current waveforms that are obtained by plotting values of currents flowing through the U-phase, V-phase, and W-phase windings in the motor 200 when the power conversion device 100 is controlled in the first state. FIG. 7 shows flows of currents that occur at a motor electrical angle of, for example, 270°. The three solid lines represent currents flowing from the power supply 101 to the motor 200.

In the state shown in FIG. 7, the FETs 131H, 132L, and 133L are on and the FETs 131L, 132H, and 133H are off in the second inverter 130. A current flowing through the FET 131H of the second inverter 130 flows through the winding M1 and the FET 121L of the first inverter 120 to the neutral point. A portion of the current flows through the FET 122L to the winding M2, and the remaining portion of the current flows through the FET 123L to the winding M3. The currents flowing through the windings M2 and M3 flow through the FET 112 for the second inverter 130 to the GND. In addition, a freewheeling current flows through a freewheeling diode (also called a "flyback diode") of the FET 131L in a direction toward the winding M1 of the motor 200.

Table 2 shows example values of currents flowing through terminals of the second inverter 130 every predetermined electrical angle of the current waveforms of FIG. 8. Specifically, Table 2 shows examples values of currents flowing through the terminals U_R, V_R, and W_R of the second inverter 130 (the bridge circuit R) every electrical angle of 30°. The definitions of the directions of currents are as described above. Note that, according to the definitions of the current directions, the sign (positivity or negativity) of each current value shown in FIG. 8 is opposite to that shown in Table 2 (phase difference: 180°).

TABLE 2

| Operation | | Electrical angles [deg] | | | | | | | | | | | |
|---|---|---|---|---|---|---|---|---|---|---|---|---|---|
| under normal conditions | | 0 (360) | 30 | 60 | 90 | 120 | 150 | 180 | 210 | 240 | 270 | 300 | 330 |
| Bridge circuit R | U_R phase | 0 | $-I_2$ | $-I_1$ | $-I_{pk}$ | $-I_1$ | $-I_2$ | 0 | $I_2$ | $I_1$ | $I_{pk}$ | $I_1$ | $I_2$ |
| | V_R phase | $I_1$ | $I_{pk}$ | $I_1$ | $I_2$ | 0 | $-I_2$ | $-I_1$ | $-I_{pk}$ | $-I_1$ | $-I_2$ | 0 | $I_2$ |
| | W_R phase | $-I_1$ | $-I_2$ | 0 | $I_2$ | $I_1$ | $I_{pk}$ | $I_1$ | $I_2$ | 0 | $-I_2$ | $-I_1$ | $-I_{pk}$ |

For example, at an electrical angle of 30°, a current having a magnitude of $I_2$ flows through the U-phase winding M1 from the bridge circuit L to the bridge circuit R, a current having a magnitude of $I_{pk}$ flows through the V-phase winding M2 from the bridge circuit R to the bridge circuit L, and a current having a magnitude of $I_2$ flows through the W-phase winding M3 from the bridge circuit L to the bridge circuit R. At an electrical angle of 60°, a current having a magnitude of $I_1$ flows through the U-phase winding M1 from the bridge circuit L to the bridge circuit R, and a current having a magnitude of $I_1$ flows through the V-phase winding M2 from the bridge circuit R to the bridge circuit L. A current does not flow through the W-phase winding M3. The sum of a current(s) flowing into a neutral point and a current(s) flowing out of the neutral point is invariably "0" at any electrical angle. The control circuit 300 controls the switching operations of the FETs of the bridge circuit R by PWM control such that, for example, the current waveforms of FIG. 8 are obtained.

As can be seen from Tables 1 and 2, motor currents flowing through the motor 200 at any electrical angle are the same between the control under normal conditions and the control under abnormal conditions. Therefore, compared to the control under normal conditions, the motor assistive torque is not reduced in the control under abnormal conditions.

The power supply 101 is not electrically connected to the first inverter 120, and therefore, a current does not flow from the power supply 101 into the first inverter 120. In addition, the first inverter 120 is not electrically connected to the GND, and therefore, a current flowng through the neutral point does not flow to the GND. As a result, a power loss can be prevented or reduced, and suitable current control can be achieved by the formation of a closed loop of a drive current.

In the event of an open-circuit failure in a high-side switching element (the FET 121H), the state of the FETs of the two switch circuits 110 and the first inverter 120 is not limited to the first state. For example, the control circuit 300 may put these FETs into a second state. In the second state, the FET 113 is on and the FET 111 is off, and the FETs 112 and 114 are on, in the two switch circuits 110. In addition, the FETs 122H and 123H other than the failed FET 121H are off, and the FETs 121L, 122L, and 123L are on, in the first inverter 120. The first state is different from the second state in whether or not the FET 113 is on. A reason why the FET 113 may be on is that, in the event of an open-circuit failure in the FET 121H, if the FETs 122H and 123H are controlled to be off, all the high-side switching elements are put into the open state, and therefore, in this case, even when the FET 113 is on, a current does not flow from the power supply 101 to the first inverter 120. Thus, in the event of an open-circuit failure, the FET 113 may be either on or off.

(2-2. High-Side Switching Element Short-Circuit Failure)

The control under abnormal conditions will be described that is performed in the event of a short-circuit failure in one of the three high-side switching elements in the bridge circuit of the first inverter 120.

It is assumed that a short-circuit failure has occurred in the FET 121H of the high-side switching elements (the FETs 121H, 122H, and 123H) of the first inverter 120. Note that, in the event of a short-circuit failure in the FET 122H or 123H, the power conversion device 100 can also be controlled using a control method described below.

In the event of a short-circuit failure in the FET 121H, the control circuit 300 puts the FETs 111, 112, 113, and 114 of the two switch circuits 110 and the FETs 122H, 123H, 121L, 122L, and 123L of the first inverter 120 into the first state. Note that, in the event of a short-circuit failure, if the FET 113 is turned on, a current flows from the power supply 101 into the short-circuited FET 121H. Therefore, the control in the second state is forbidden.

As in the event of an open-circuit failure, all the three low-side switching elements are turned on so that a neutral point for the windings is formed at the low-side node N1. The power conversion device 100 drives the motor 200 using the neutral point on the low side of the first inverter 120, and the second inverter 130. The control circuit 300 controls the switching operations of the FETs of the bridge circuit R by PWM control such that, for example, the current waveforms of FIG. 8 are obtained. For example, in the first state in the event of a short-circuit failure, the flows of currents flowing in the power conversion device 100 at an electrical angle of 270° are as shown in FIG. 7. In addition, the values of currents flowing through the windings every predetermined motor electrical angle are as shown in Table 2.

Note that, in the event of a short-circuit failure in the FET 121H, for example, in the first state of the FETs shown in FIG. 7, a freewheeling current flows through the parasitic diode of the FET 122H to the FET 121H at motor electrical angles of 0°-120° in Table 2, and a freewheeling current flows through the parasitic diode of the FET 123H to the FET 121H at motor electrical angles 60°-180° in Table 2. Thus, in the event of a short-circuit failure, a current may be shunted through the FET 121H when the motor electrical angle is within a certain range.

In this control, the power supply 101 is not electrically connected to the first inverter 120, and therefore, a current does not flow from the power supply 101 into the first inverter 120. In addition, the first inverter 120 is not electrically connected to the GND, and therefore, a current flowing through the neutral point does not flow to the GND.

(2-3. Low-Side Switching Element Open-Circuit Failure)

The control under abnormal conditions will be described that is performed in the event of an open-circuit failure in one of the three low-side switching elements in the bridge circuit of the first inverter 120.

It is assumed that, of the low-side switching elements (the FETs 121L, 122L, and 123L) of the first inverter 120, an open-circuit failure has occurred in the FET 121L. Note that, in the event of an open-circuit failure in the FET 122L or 123L, the power conversion device 100 can also be controlled by a control method described below.

In the event of an open-circuit failure in the FET 121L, the control circuit 300 puts the FETs 111, 112, 113, and 114 of the two switch circuits 110 and the FETs 121H, 122H, 123H, 122L, and 123L of the first inverter 120 into a third state. In the third state, the FETs 111 and 113 are off and the FETs 112 and 114 are on in the two switch circuits 110. In addition, the FETs 122L and 123L other than the failed FET 121L (the low-side switching elements other than the failed FET 121L) are off, and the FETs 121H, 122H, and 123H are on, in the first inverter 120.

In the third state, the first inverter 120 is electrically disconnected from the power supply 101 and the GND, and the second inverter 130 is electrically connected to the power supply 101 and the GND. In addition, all the three high-side switching elements of the first inverter 120 are on, and therefore, a neutral point for the windings is formed at the high-side node N3.

Figure 9:
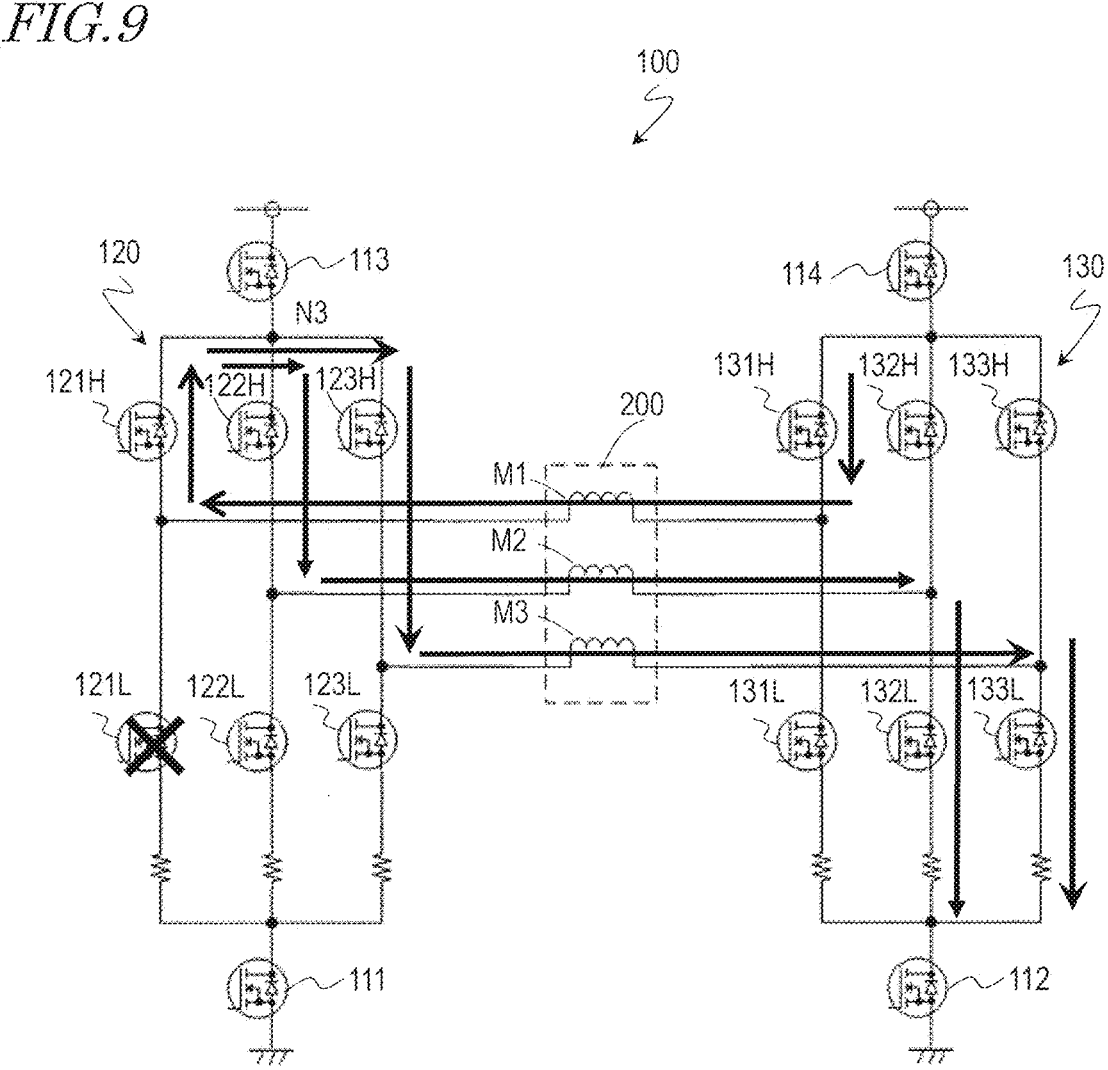
FIG. 9 is a schematic diagram showing flows of currents in the power conversion device 100 that occur when the FETs of the two switch circuits 110 and the first inverter 120 are in a third state.

FIG. 9 schematically shows flows of currents in the power conversion device 100 that occur when the FETs of the two switch circuits 110 and the first inverter 120 are in the third state. FIG. 9 shows flows of currents at a motor electrical angle of, for example, 270°. The three solid lines represent currents flowing from the power supply 101 to the motor 200.

In the state shown in FIG. 9, the FETs 131H, 132L, and 133L are on and the FETs 131L, 132H, and 133H are off in the second inverter 130. A current flowing through the FET 131H of the second inverter 130 flows through the winding M1 and the FET 121H of the first inverter 120 to the neutral point. A portion of the current flows through the FET 122H to the winding M2, and the remaining current flows through the FET 123H to the winding M3. The currents flowing through the windings M2 and M3 flow through the FET 112 for the second inverter 130 to the GND. In addition, a freewheeling current flows through the freewheeling diode of the FET 131L in a direction toward the winding M1 of the motor 200. For example, the values of currents flowing through the windings every predetermined motor electrical angle are as shown in Table 2.

The power conversion device 100 drives the motor 200 using the neutral point formed on the high side of the first inverter 120, and the second inverter 130. The control circuit 300 controls the switching operations of the FETs of the bridge circuit R by PWM control such that, for example, the current waveforms of FIG. 8 are obtained.

In this control, the power supply 101 is not electrically connected to the first inverter 120, and therefore, a current does not flow from the power supply 101 into the neutral point of the first inverter 120. In addition, the first inverter 120 is not electrically connected to the GND, and therefore, a current does not flow from the first inverter 120 to the GND.

In the event of an open-circuit failure in the low-side switching element (the FET 121L), the state of the FETs of the two switch circuits 110 and the first inverter 120 is not limited to the third state. For example, the control circuit 300 may put these FETs into a fourth state. In the fourth state, the FET 113 is off and the FET 111 is on, and the FETs 112 and 114 are on, in the two switch circuits 110. In addition, the FETs 122L and 123L other than the failed FET 121L are off, and the FETs 121H, 122H, and 123H are on, in the first inverter 120. The third state is different from the fourth state in whether or not the FET 111 is on. A reason why the FET 111 may be on is that, in the event of an open-circuit failure in the FET 121L, if the FETs 122L and 123L are controlled to be off, all the low-side switching elements are put into the open state, and therefore, in this case, even when the FET 111 is on, a current does not flow to the GND. Thus, in the event of an open-circuit failure, the FET 111 may be either on or off.

(2-4. Low-Side Switching Element Short-Circuit Failure)

The control under abnormal conditions will be described that is performed in the event of a short-circuit failure in one of the three low-side switching elements in the bridge circuit of the first inverter 120.

It is assumed that, of the low-side switching elements (the FETs 121L, 122L, and 123L) of the first inverter 120, a short-circuit failure has occurred in the FET 121L. Note that, in the event of a short-circuit failure in the FET 122L or 123L, the power conversion device 100 can also be controlled by a control method described below.

In the event of a short-circuit failure in the FET 121L, the control circuit 300 puts the FETs 111, 112, 113, and 114 of the two switch circuits 110 and the FETs 121H, 122H, 123H, 122L, and 123L of the first inverter 120 into the third state as in the event of an open-circuit failure. Note that, in the event of a short-circuit failure, if the FET 111 is turned on, a current flows from the short-circuited FET 121L into the GND. Therefore, the control in the fourth state is forbidden.

Figure 10:
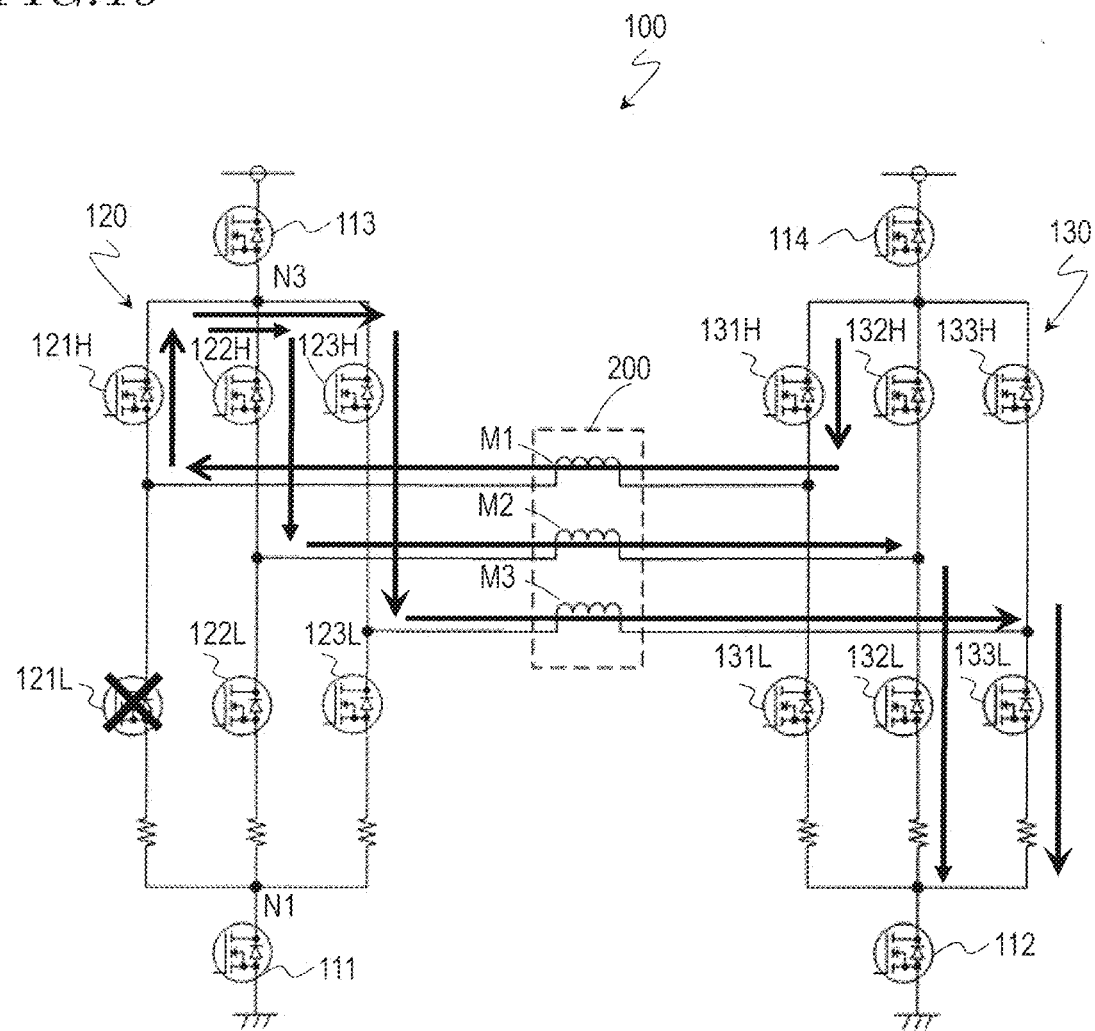
FIG. 10 is a schematic diagram showing flows of currents in the power conversion device 100 that occur when the FETs of the two switch circuits 110 and the first inverter 120 are in the third state.

FIG. 10 schematically shows flows of currents in the power conversion device 100 that occur when the FETs of the two switch circuits 110 and the first inverter 120 are in the third state. FIG. 10 shows flows of currents at a motor electrical angle of, for example, 270°. The three solid lines represent currents flowing from the power supply 101 to the motor 200.

In the state shown in FIG. 10, the FETs 131H, 132L, and 133L are on and the FETs 131L, 132H, and 133H are off in the second inverter 130. A current flowing through the FET 131H of the second inverter 130 flows through the winding M1 and the FET 121H of the first inverter 120 to the neutral point. A portion of the current flows through the FET 122H to the winding M2, and the remaining current flows through the FET 123H to the winding M3. The currents flowing through the windings M2 and M3 flow through the FET 112 for the second inverter 130 to the GND. In addition, a freewheeling current flows through the freewheeling diode of the FET 131L in a direction toward the winding M1 of the motor 200. Furthermore, in the event of a short-circuit failure, a current flows from the short-circuited FET 121L to the low-side node N1 unlike the event of an open-circuit failure. A portion of the current flows through the freewheeling diode of the FET 122L to the winding M2, and the remaining current flows through the freewheeling diode of the FET 123L to the winding M3. The current flowing through the windings M2 and M3 flow through the FET 112 to the GND.

For example, the values of currents flowing through the windings every predetermined motor electrical angle are as shown in Table 2.

The power conversion device 100 drives the motor 200 using the neutral point formed on the high side of the first inverter 120, and the second inverter 130. The control circuit 300 controls the switching operations of the FETs of the bridge circuit R by PWM control such that, for example, the current waveforms of FIG. 8 are obtained.

In this control, the power supply 101 is not electrically connected to the first inverter 120, and therefore, a current does not flow from the power supply 101 into the neutral point of the first inverter 120. In addition, the first inverter 120 is not electrically connected to the GND, and therefore, a current does not flow from the first inverter 120 to the GND.

(2-5. Power Supply-Side Switch Element Open-Circuit Failure)

The control under abnormal conditions will be described that is performed in the event of an open-circuit failure in the FET 113 of the power supply-side switch circuit 110.

It is assumed that an open-circuit failure has occurred in the FET 113 of the power supply-side switch circuit 110. In this case, the control circuit 300 puts the FETs 111, 112, and 114 of the two switch circuits 110 and the FETs 121H, 122H, 123H, 121L, 122L, and 123L of the first inverter 120 into a fifth state. In the fifth state, the FET 111 is off and the FETs 112 and 114 are on in the two switch circuits 110. In addition, the FETs 121L, 122L, and 123L are on and the FETs 121H, 122H, and 123H are off in the first inverter 120.

In the fifth state, the first inverter 120 is electrically disconnected from the power supply 101 and the GND, and the second inverter 130 is electrically connected to the power supply 101 and the GND, since the FET 113 is in the open state. In addition, all the three low-side switching elements of the first inverter 120 are on, and therefore, a neutral point for the windings is formed at the low-side node N1.

Figure 11:
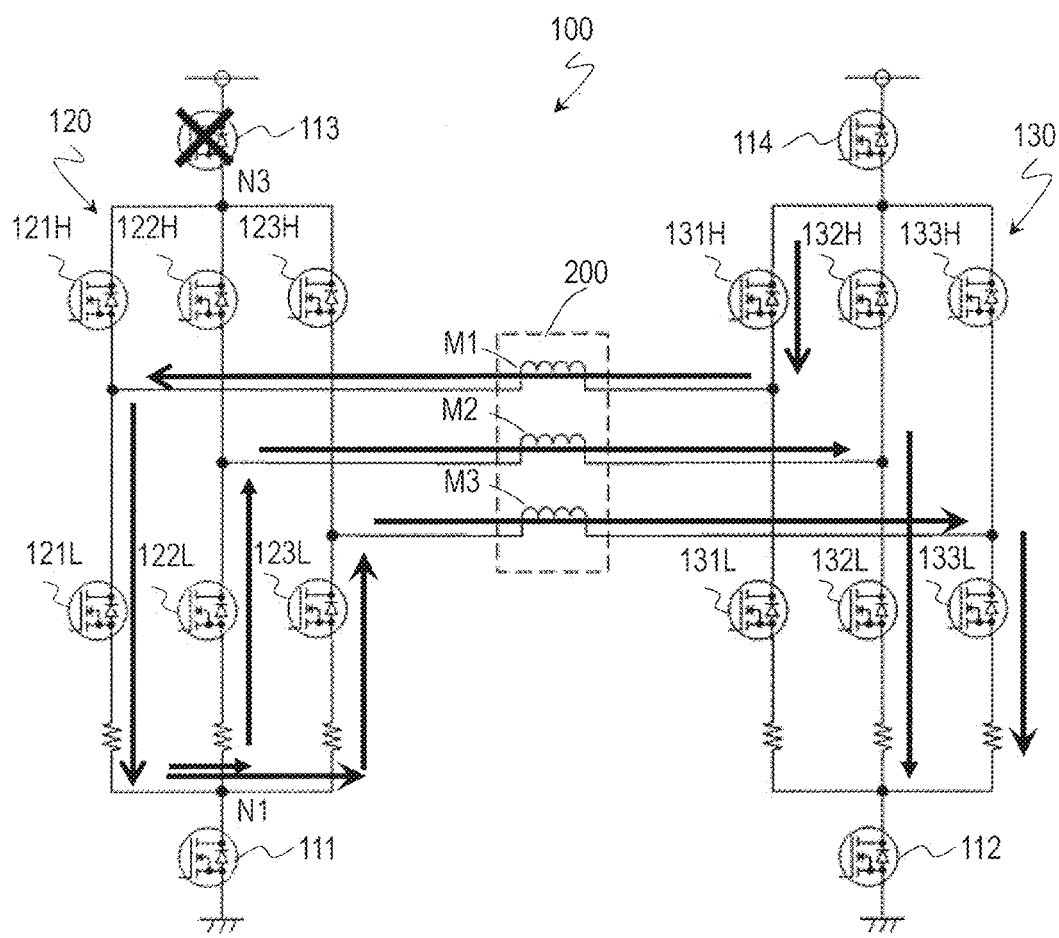
FIG. 11 is a schematic diagram showing flows of currents in the power conversion device 100 that occur when the FETs of the two switch circuits 110 and the first inverter 120 are in a fifth state.

FIG. 11 schematically shows flows of currents in the power conversion device 100 that occur when the FETs of the two switch circuits 110 and the first inverter 120 are in the fifth state. FIG. 11 shows flows of currents at a motor electrical angle of, for example, 270°. The three solid lines represent currents flowing from the power supply 101 to the motor 200.

In the state shown in FIG. 11, the FETs 131H, 132L, and 133L are on and the FETs 131L, 132H, and 133H are off in the second inverter 130. A current flowing through the FET 131H of the second inverter 130 flows through the winding M1 and the FET 121L of the first inverter 120 to the neutral point. A portion of the current flows through the FET 122L to the winding M2, and the remaining current flows through the FET 123L to the winding M3. The currents flowing through the windings M2 and M3 flow through the FET 112 for the second inverter 130 to the GND. In addition, a freewheeling current flows through the freewheeling diode of the FET 131L in a direction toward the winding M1 of the motor 200. For example, the values of currents flowing through the windings every predetermined motor electrical angle are as shown in Table 2.

The power conversion device 100 drives the motor 200 using the neutral point formed on the low side of the first inverter 120, and the second inverter 130. The control circuit 300 controls the switching operations of the FETs of the bridge circuit R by PWM control such that, for example, the current waveforms of FIG. 8 are obtained. For example, the values of currents flowing through the windings every predetermined motor electrical angle are as shown in Table 2.

In the event of an open-circuit failure in the FET 113, a neutral point may be formed on either the low side or the high side. The control circuit 300 can put the FETs 111, 112, and 114 of the two switch circuits 110 and the FETs 121H, 122H, 123H, 121L, 122L, and 123L of the first inverter 120 into a sixth state. In the sixth state, the FETs 112 and 114 are on in the two switch circuits 110. In addition, the FETs 121L, 122L, and 123L are off and the FETs 121H, 122H, and 123H are on in the first inverter 120. The FET 111 of the GND-side switch circuit 110 may be either on or off.

In the sixth state, the first inverter 120 is electrically disconnected from the power supply 101 and the GND, and the second inverter 130 is electrically connected to the power supply 101 and the GND, since the FET 113 is in the open state. In addition, all the three low-side switching elements of the first inverter 120 are on, and therefore, a neutral point for the windings is formed at the high-side node N3.

Figure 12:
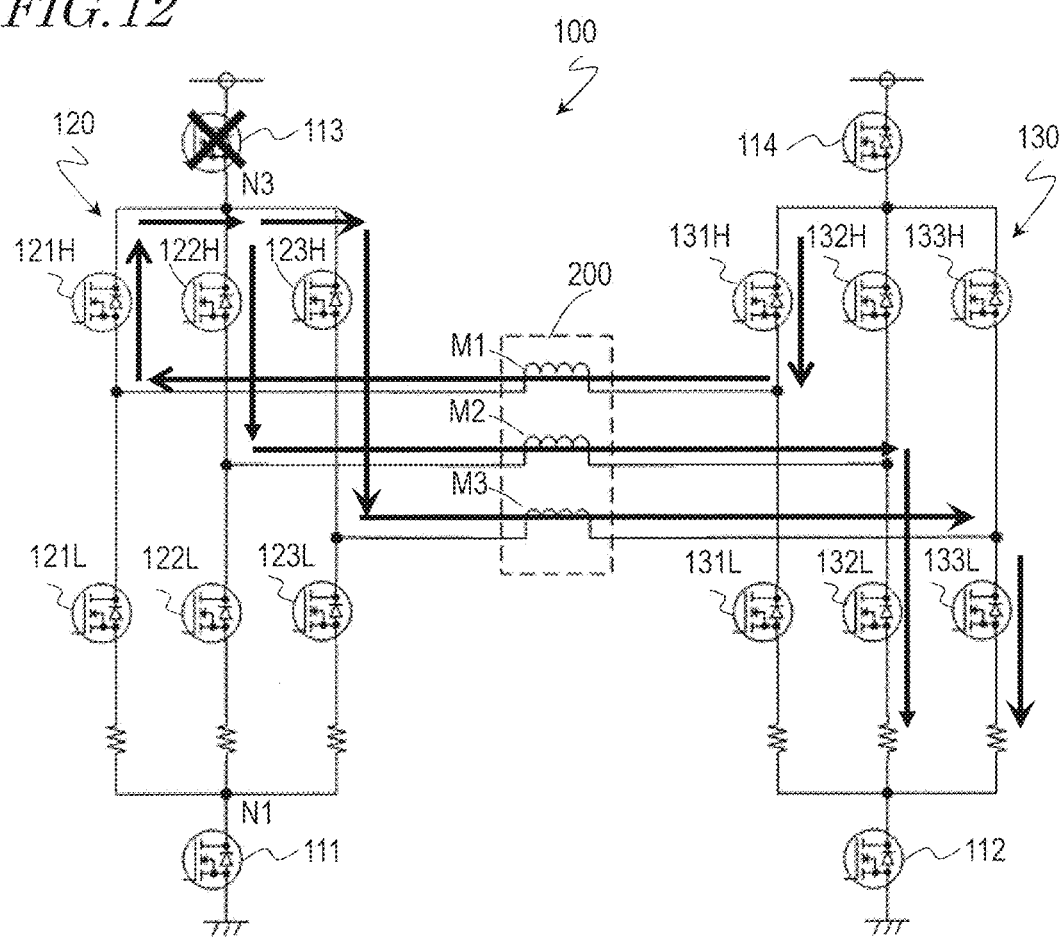
FIG. 12 is a schematic diagram showing flows of currents in the power conversion device 100 that occur when the FETs of the two switch circuits 110 and the first inverter 120 are in a sixth state.

FIG. 12 schematically shows flows of currents in the power conversion device 100 that occur when the FETs of the two switch circuits 110 and the first inverter 120 are in the sixth state. FIG. 12 shows flows of currents at a motor electrical angle of, for example, 270°. The three solid lines represent currents flowing from the power supply 101 to the motor 200.

The power conversion device 100 drives the motor 200 using the neutral point formed on the high side of the first inverter 120, and the second inverter 130. The control circuit 300 controls the switching operations of the FETs of the bridge circuit R by PWM control such that, for example, the current waveforms of FIG. 8 are obtained.

In this control, the power supply 101 is not electrically connected to the first inverter 120, and therefore, a current does not flow from the power supply 101 into the neutral point of the first inverter 120. In addition, irrespective of whether the FET 111 is on or off, all the low-side switching elements are off, and therefore, a current does not flow from the first inverter 120 to the GND.

In the event of an open-circuit failure in the FET 113, the state of the FETs of the two switch circuits 110 and the first inverter 120 is not limited to the fifth or sixth state. For example, the control circuit 300 may put these FETs into a seventh state. In the seventh state, the FET 111 is off and the FETs 112 and 114 are on in the two switch circuits 110. In addition, the FETs 121L, 122L, and 123L are on and at least one of the FETs 121H, 122H, and 123H is on in the first inverter 120. The seventh state is different from the fifth state in that at least one of the high-side switching elements is on.

For example, when one FET of the three high-side switching elements is on, a current does not flow through that FET due to the parasitic diodes of the other two FETs at certain motor electrical angles. For example, in the fifth state of the FETs shown in FIG. 11, when the motor electrical angle is 270°, then if the FET 121H is on and the other FETs 122H and 123H are off, a current does not flow on the high side. When the motor electrical angle is 180°-360° in Table 2, a current does not flow on the high side. Meanwhile, in the fifth state of the FETs shown in FIG. 11, when the motor electrical angle is 0°-120° in Table 2, then if the FET 121H is on and the other FETs 122H and 123H are off, a freewheeling current flows through the parasitic diode of the FET 122H to the FET 121H. When the motor electrical angle is 60°-180° in Table 2, a freewheeling current flows through the parasitic diode of the FET 123H to the FET 121H. Note that because an open-circuit failure has occurred in the FET 113, a current does not flow from the power supply 101 to the high-side node N3. Thus, if at least one of the high-side switching elements is turned on, a current may be shunted, i.e., currents may flow in a more distributed manner, when the motor electrical angle is within a certain range, resulting in a reduction in heat influence.

If all the high-side switching elements are turned on, two neutral points are formed on the low and high sides. Note that because an open-circuit failure has occurred in the FET 113, a current does not flow from the power supply 101 to the neutral point on the high-side node. A current may be shunted using the two neutral points, i.e., currents may flow in a more distributed manner, resulting in a reduction in heat influence on the inverter.

(2-6. Power Supply-Side Switch Element Short-Circuit Failure)

The control under abnormal conditions will be described that is performed in the event of a short-circuit failure in the FET 113 of the power supply-side switch circuit 110.

It is assumed that a short-circuit failure has occurred in the FET 113 of the power supply-side switch circuit 110. In this case, the control circuit 300 puts the FETs 111, 112, and 114 of the two switch circuits 110 and the FETs 121H, 122H, 123H, 121L, 122L, and 123L of the first inverter 120 into the fifth state. Note that if at least one of the high-side switching elements is turned on, a current flows through the FET 113 to the on-state high-side switching element. Therefore, the control in the seventh state is forbidden.

As in the event of an open-circuit failure, all the three low-side switching elements are turned on so that a neutral point for the windings is formed at the low-side node N1. The power conversion device 100 drives the motor 200 using the neutral point formed on the low side of the first inverter 120, and the second inverter 130. The control circuit 300 controls the switching operations of the FETs of the bridge circuit R by PWM control such that, for example, the current waveforms of FIG. 8 are obtained. For example, in the fifth state in the event of a short-circuit failure, the flows of currents in the power conversion device 100 at an electrical angle of 270° are as shown in FIG. 11. The values of currents flowing through the windings every predetermined motor electrical angle are as shown in Table 2.

In this control, all the high-side switching elements are off, and therefore, a current does not flow from the power supply 101 into the first inverter 120, irrespective of the occurrence of a short circuit in the FET 113. In addition, the first inverter 120 is not electrically connected to the GND, and therefore a current flowing the neutral point does not flow to the GND.

(2-7. GND-Side Switch Element Open-Circuit Failure)

The control under abnormal conditions will be described that is performed in the event of an open-circuit failure in the FET 111 of the GND-side switch circuit 110.

It is assumed that an open-circuit failure has occurred in the FET 111 of the GND-side switch circuit 110. In this case, the control circuit 300 puts the FETs 112, 113, and 114 of the two switch circuits 110 and the FETs 121H, 122H, 123H, 121L, 122L, and 123L of the first inverter 120 into an eighth state. In the eighth state, the FET 113 is off and the FETs 112 and 114 are on in the two switch circuits 110. In addition, the FETs 121L, 122L, and 123L are off and the FETs 121H, 122H, and 123H are on in the first inverter 120.

In the eighth state, the first inverter 120 is electrically disconnected from the power supply 101 and the GND, and the second inverter 130 is electrically connected to the power supply 101 and the GND, since the FET 111 is in the open state. In addition, all the three high-side switching elements of the first inverter 120 are on, and therefore, a neutral point for the windings is formed at the high-side node N3.

Figure 13:
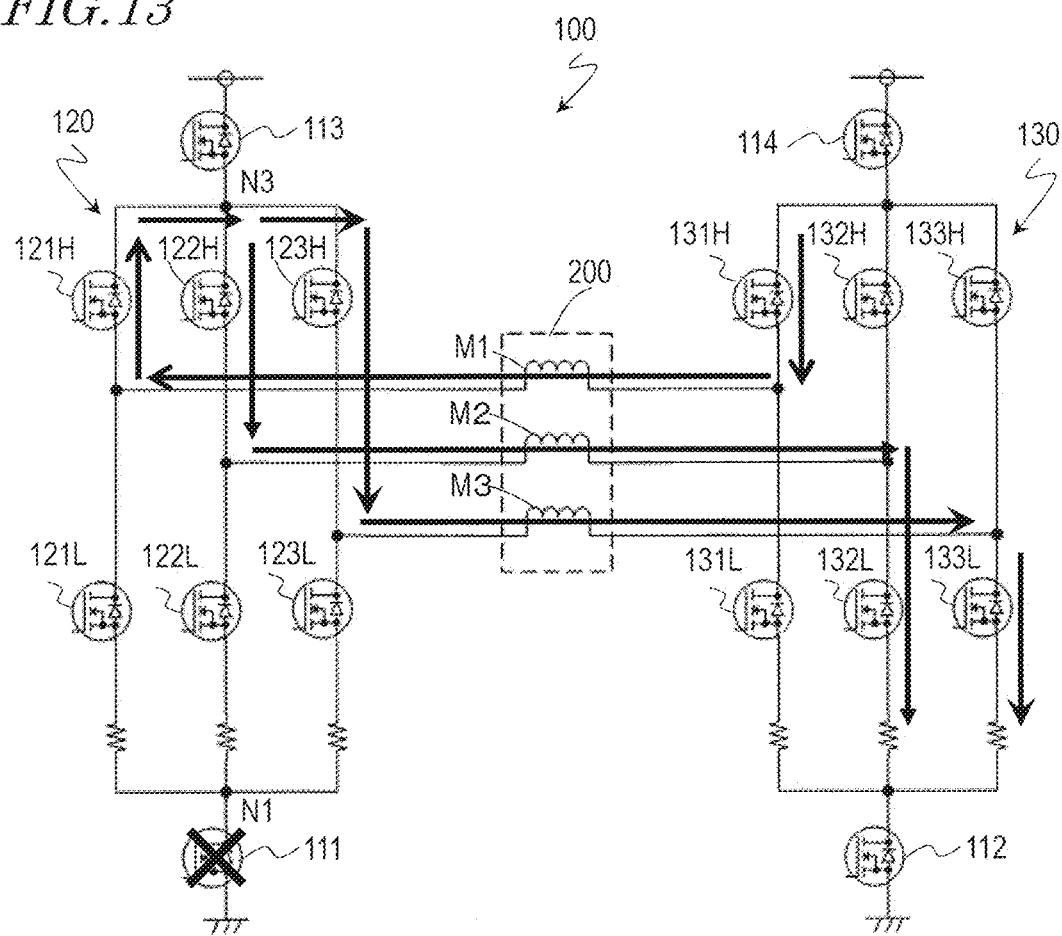
FIG. 13 is a schematic diagram showing flows of currents in the power conversion device 100 that occur when the FETs of the two switch circuits 110 and the first inverter 120 are in an eighth state.

FIG. 13 schematically shows flows of currents in the power conversion device 100 that occur when the FETs of the two switch circuits 110 and the first inverter 120 are in the eighth state. FIG. 13 shows flows of currents at a motor electrical angle of, for example, 270°. The three solid lines represent currents flowing from the power supply 101 to the motor 200.

In the state shown in FIG. 13, the FETs 131H, 132L, and 133L are on and the FETs 131L, 132H, and 133H are off in the second inverter 130. A current flowing through the FET 131H of the second inverter 130 flows through the winding M1 and the FET 121H of the first inverter 120 to the neutral point. A portion of the current flows through the FET 122H to the winding M2, and the remaining current flows through the FET 123H to the winding M3. The currents flowing through the windings M2 and M3 flow through the FET 112 for the second inverter 130 to the GND. In addition, a freewheeling current flows through the freewheeling diode of the FET 131L in a direction toward the winding M1 of the motor 200.

The power conversion device 100 drives the motor 200 using the neutral point formed on the high side of the first inverter 120, and the second inverter 130. The control circuit 300 controls the switching operations of the FETs of the bridge circuit R by PWM control such that, for example, the current waveforms of FIG. 8 are obtained. For example, the values of currents flowing through the windings every predetermined motor electrical angle are as shown in Table 2.

In this control, the power supply 101 is not electrically connected to the first inverter 120, and therefore, a current does not flow from the power supply 101 into the neutral point of the first inverter 120. In addition, the failed FET 111 is in the open state, and therefore, a current does not flow from the first inverter 120 to the GND.

In the event of an open-circuit failure in the FET 111, the state of the FETs of the two switch circuits 110 and the first inverter 120 is not limited to the eighth state. For example, the control circuit 300 may put these FETs into a ninth state. In the ninth state, the FET 113 is off and the FETs 112 and 114 are on in the two switch circuits 110. In addition, at least one of the FETs 121L, 122L, and 123L is on and the FETs 121H, 122H, and 123H are on in the first inverter 120. The ninth state is different from the eighth state in that at least one of the low-side switching elements is on.

For example, when one FET of the three low-side switching elements is on, a current does not flow through that FET due to the parasitic diodes of the other two FETs at certain motor electrical angles. For example, in the eighth state of the FETs shown in FIG. 13, when the motor electrical angle is 270°, then if the FET 121L is on and the other FETs 122L and 123L are off, a freewheeling current flows through the FET 121L to the parasitic diodes of the FETs 122L and 123L. When the motor electrical angle is 180°-360° in Table 2, a current flows on the low side. Note that because an open-circuit failure has occurred in the FET 111, a current does not flow from the neutral point on the low side to the GND. Thus, if at least one of the low-side switching elements is on, a current may be shunted, i.e., currents may flow in a more distributed manner, when the motor electrical angle is within a certain range, resulting in a reduction in heat influence.

If all the low-side switching elements are turned on, two neutral points are formed on the low and high sides. Note that because an open-circuit failure has occurred in the FET 111, a current does not flow the neutral point on the low side to the GND. A current may be shunted using the two neutral points, i.e., currents may flow in a more distributed manner, resulting in a reduction in heat influence on the inverter.

(2-8. GND-Side Switch Element Short-Circuit Failure)

The control under abnormal conditions will be described that is performed in the event of a short-circuit failure in the FET 111 of the GND-side switch circuit 110.

It is assumed that a short-circuit failure has occurred in the FET 111 of the GND-side switch circuit 110. In this case, the control circuit 300 puts the FETs 112, 113, and 114 of the two switch circuits 110 and the FETs 121H, 122H, 123H, 121L, 122L, and 123L of the first inverter 120 into the eighth state. Note that if at least one of the low-side switching elements is turned on, a current flows through the FET 111 to the GND. Therefore, the control in the ninth state is forbidden.

As in the event of an open-circuit failure, all the three high-side switching elements are turned on so that a neutral point for the windings is formed at the high-side node N3. The power conversion device 100 drives the motor 200 using the neutral point formed on the high side of the first inverter 120, and the second inverter 130. The control circuit 300 controls the switching operations of the FETs of the bridge circuit R by PWM control such that, for example, the current waveforms of FIG. 8 are obtained. For example, in the eighth state in the event of a short-circuit failure, the flows of currents in the power conversion device 100 at an electrical angle of 270° are as shown in FIG. 13. The values of currents flowing through the windings every predetermined motor electrical angle are as shown in Table 2.

In this control, a current does not flow from the power supply 101 into the neutral point of the first inverter 120. In addition, all the low-side switching elements are turned off, and therefore, a current does not flow from the first inverter 120 to the GND, irrespective of the occurrence of a short circuit in the FET 111.

According to this embodiment, in the control under abnormal conditions, a power loss can be prevented or reduced, and a closed loop of a drive current can be formed to achieve suitable current control.

Variations of the circuit configuration of the power conversion device 100 will be described with reference to FIGS. 14A-14D.

In this embodiment, the two switch circuits 110 of the power conversion device include the FETs 111, 112, 113, and 114. However, the present disclosure is not limited to this. The two switch circuits 110 may include at least one of the FETs 111, 112, 113, and 114.

Figure 14A:
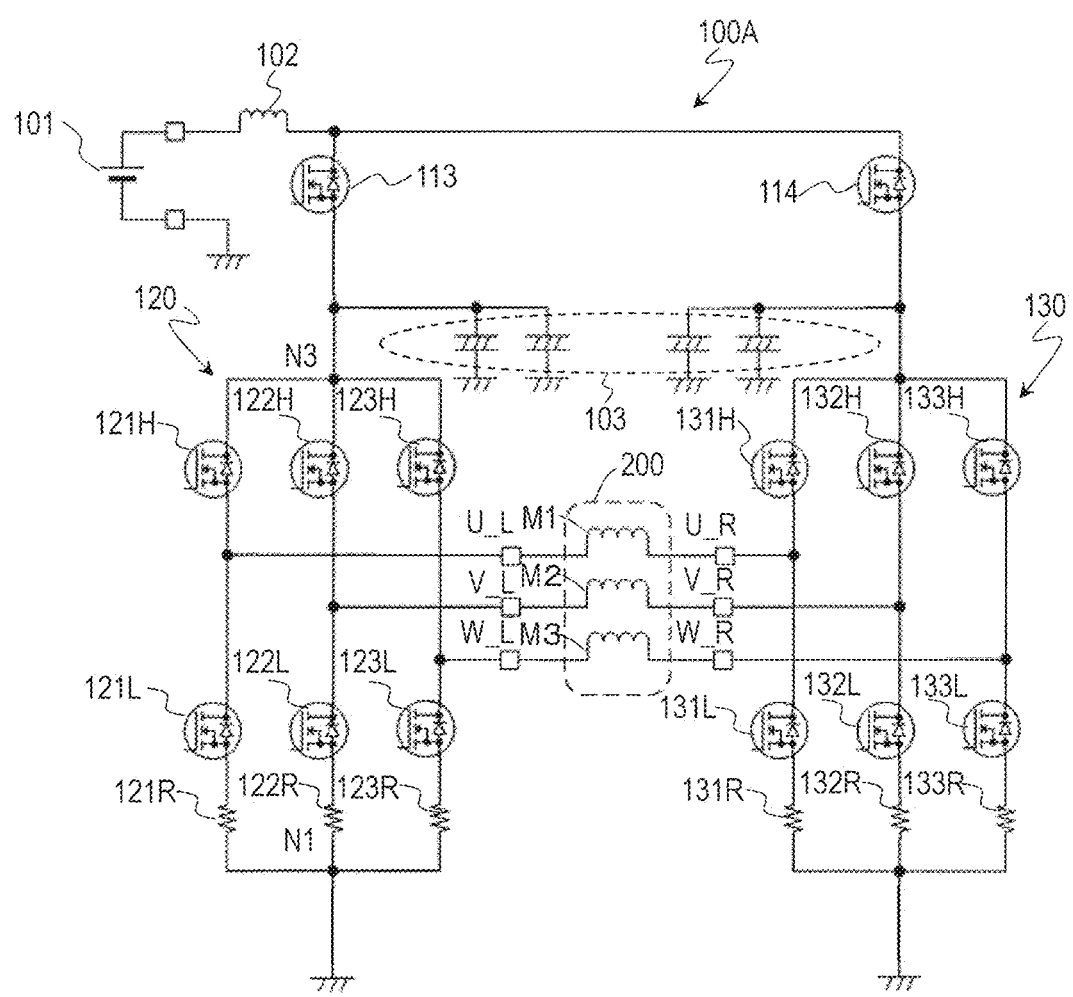
FIG. 14A is a circuit diagram showing a circuit configuration of a power conversion device 100A that includes one of the two switch circuits 110 that is a power supply-side switch circuit including FETs 113 and 114.

FIG. 14A shows a circuit configuration of a power conversion device 100A that includes the power supply-side switch circuit including the FETs 113 and 114 of the two switch circuits 110. In this variation, for example, in the event of a short-circuit failure in the FET 121H, if the FET 113 is turned off, a current can be prevented from flowing from the power supply 101 to the FET 121H. In other words, when the first inverter 120 is not operating normally, the FET 113 breaks the connection between the power supply 101 and the first inverter 120. In addition, the FETs 121L, 122L, and 123L are turned off and the FETs 122H and 123H are turned on so that a neutral point is formed at the high-side node N3.

Figure 14B:
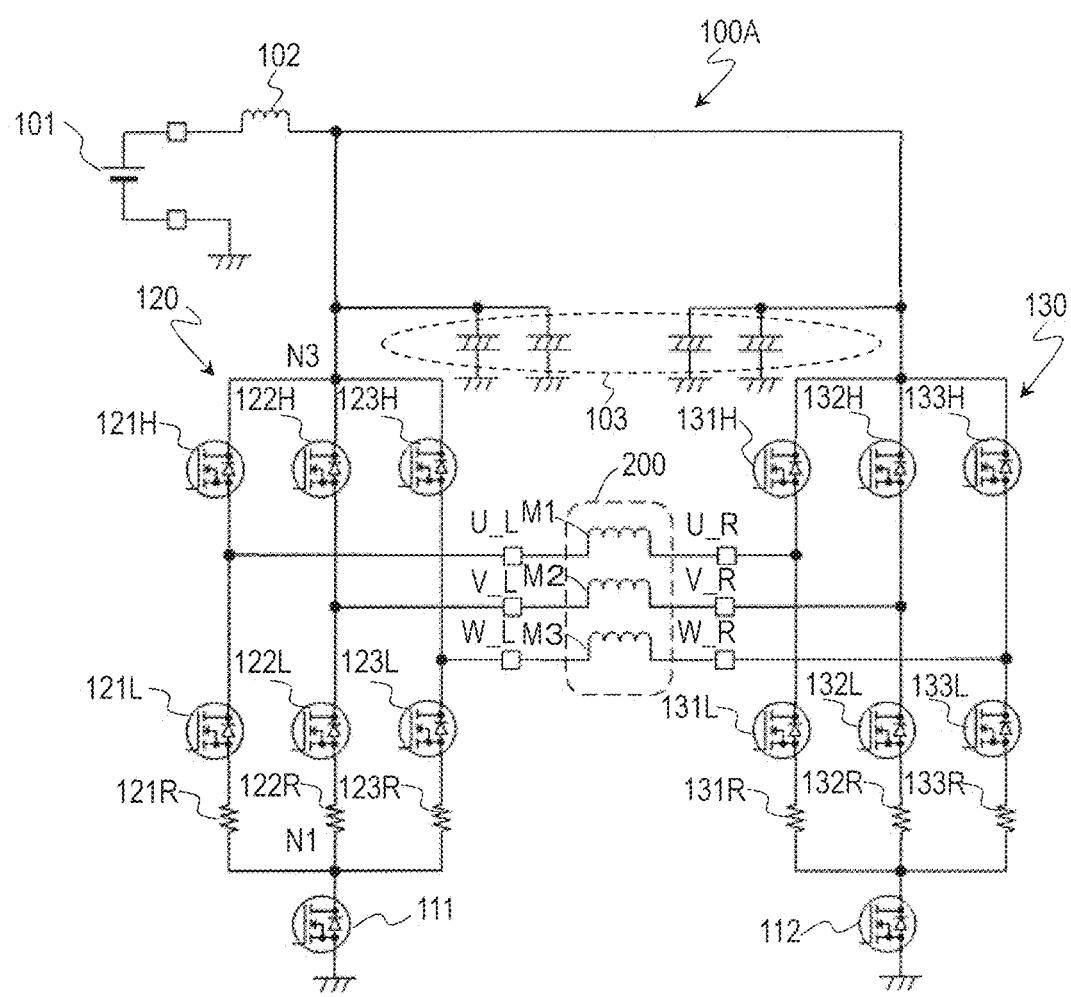
FIG. 14B is a circuit diagram showing a circuit configuration of a power conversion device 100A that includes one of the two switch circuits 110 that is a GND-side switch circuit including FETs 111 and 112.

FIG. 14B shows a circuit configuration of a power conversion device 100A that includes the GND-side switch circuit including the FETs 111 and 112 of the two switch circuits 110. In this variation, for example, in the event of a short-circuit failure in the FET 121L, if the FET 111 is turned off, a current can be prevented from flowing through the FET 121L to the GND. In other words, when the first inverter 120 is not operating normally, the FET 111 breaks the connection between the first inverter 120 and the GND. In addition, the FETs 121H, 122H, and 123H are turned off and the FETs 122L and 123L are turned on so that a neutral point is formed at the low-side node N1.

Figure 14C:
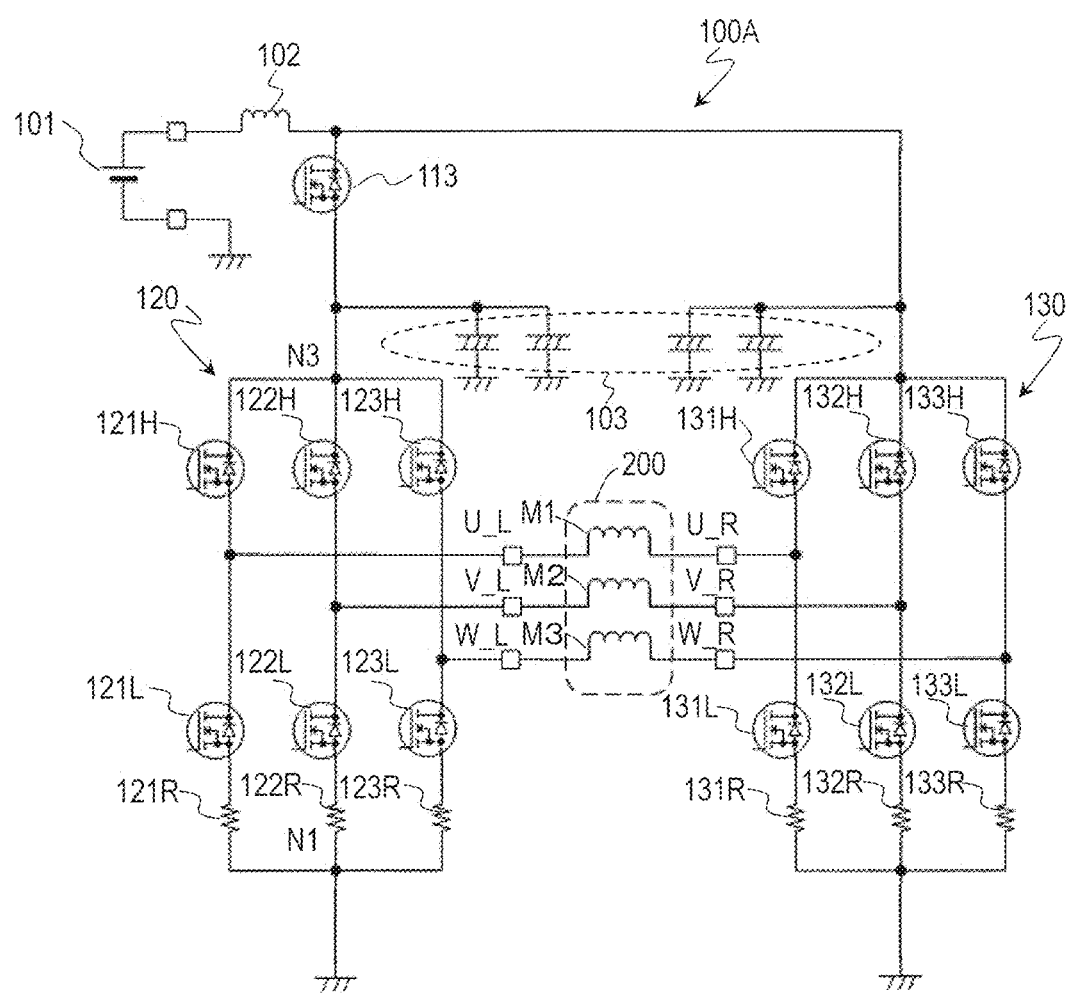
FIG. 14C is a circuit diagram showing a circuit configuration of a power conversion device 100A that includes a switch circuit 110 including one of the switch elements that is the FET 113.

FIG. 14C shows a circuit configuration of a power conversion device 100A that includes a switch circuit 110 including only the FET 113 of the above switch elements. In this variation, for example, in the event of a short-circuit failure in the FET 121H, if the FET 113 is turned off, a current can be prevented from flowing from the power supply 101 to the FET 121H. In addition, the FETs 121L, 122L, and 123L are turned off and the FETs 122H and 123H are turned on so that a neutral point is formed at the high-side node N3.

Figure 14D:
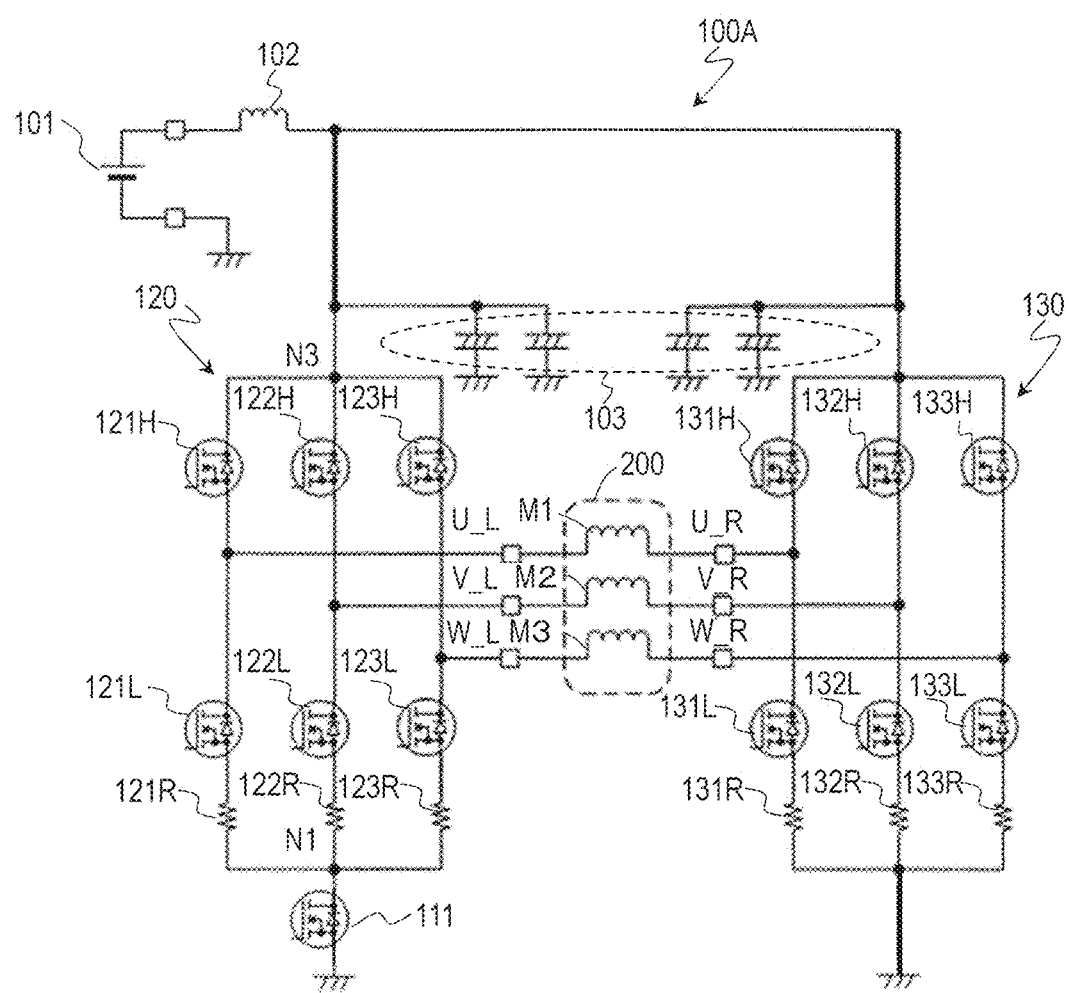
FIG. 14D is a circuit diagram showing a circuit configuration of a power conversion device 100A that includes a switch circuit 110 including one of the switch elements that is the FET 111.

FIG. 14D shows a circuit configuration of a power conversion device 100A that includes a switch circuit 110 including only the FET 111 of the above switch elements. In this variation, for example, in the event of a short-circuit failure in the FET 121L, if the FET 111 is turned off, a current can be prevented from flowing from the FET 121L to the GND. In addition, the FETs 121H, 122H, and 123H are turned off and the FETs 122L and 123L are turned on so that a neutral point is formed at the low-side node N1.

Note that the two switch circuits 110 may have only either the FET 112 or the FET 114 of the above switch elements. Alternatively, the two switch circuits 110 may include any combination of the above switch elements, i.e., one or more selected from the FETs 111, 112, 113, and 114.

In the above embodiments, it is assumed that, of the two inverters, the first inverter 120 is a failed inverter and the second inverter 130 is operating normally. In the case where the second inverter 130 is a failed inverter and the first inverter 120 is operating normally, the control under abnormal conditions can be similarly performed. In this case, the roles in the control of the first inverter 120 and the second inverter 130 are switched, and the roles in the control of the switch elements of each switch circuit 110 are switched. Specifically, a neutral point is formed in the second inverter 130, and the motor 200 can be driven using the neutral point and the first inverter 120.

Next, gate control signals for turning on and off the high-side switching elements (the FETs 121H, 122H, 123H, 131H, 132H, and 133H) and the low-side switching elements (the FETs 121L, 122L, 123L, 131L, 132L, and 133L) will be described. Here, the high-side switching elements (the FETs 121H, 122H, and 123H) and the low-side switching elements (the FETs 121L, 122L, and 123L) of the first inverter 120 will be mainly described. The second inverter 130 is similarly controlled.

In the control performed when the first inverter 120 is operating normally, the drive circuit 350 supplies gate control signals for turning on or off the FETs 121L, 122L, and 123L to the FETs 121L, 122L, and 123L. The FET 111 of the switch circuit 110 is on, and therefore, the source potentials of the FETs 121L, 122L, and 123L are the same as the potential of the GND, i.e., are low. Because a reference potential for the gates is the same as the potential of the GND, a gate control signal having a relatively low voltage (gate voltage) can be used to turn on the FETs 121L, 122L, and 123L. The voltage of a gate control signal may also be hereinafter referred to as a "gate voltage." In this example, the voltage of a gate control signal and the gate voltage take a value with reference to the potential of the GND.

Meanwhile, the source potentials of the FETs 121H, 122H, and 123H are the same as drive voltages supplied to the windings M1, M2, and M3, i.e., are high. Therefore, a gate voltage for turning on the FETs 121H, 122H, and 123H is set to be higher than a gate voltage for turning on the FETs 121L, 122L, and 123L. The higher gate voltage is generated by, for example, the booster circuit 370 (FIG. 5).

In the control performed when the first inverter 120 is operating normally, the gate voltage for turning on the FETs 121L, 122L, and 123L is, for example, 12 V. The gate voltage for turning on the FETs 121H, 122H, and 123H is, for example, 24 V.

In the event of an open-circuit or short-circuit failure in at least one of the FETs 121H, 122H, and 123H, a neutral point is formed at the low-side node N1 as described above. The FETs 111 and 113 of the switch circuits 110 are turned off. In this case, the source potentials of the FETs 121L, 122L, and 123L are not the same as the potential of the GND. The source potentials of the FETs 121L, 122L, and 123L are the same as the potential of the neutral point that is higher than the potential of the GND. In other words, a reference voltage for the sources of the FETs 121L, 122L, and 123L is in a floating state. Therefore, compared to the control under normal conditions, the gate-source voltages of the FETs 121L, 122L, and 123L are small.

When the gate-source voltages are small, the FETs 121L, 122L, and 123L in the on-state may have a large source-drain resistance value, or the FETs 121L, 122L, and 123L may be accidentally turned off. Therefore, in order to form a neutral point at the low-side node N1, the voltages (gate voltages) of the gate control signals for turning on the FETs 121L, 122L, and 123L may be set to be higher than when the first inverter 120 is operating normally.

Figure 15:
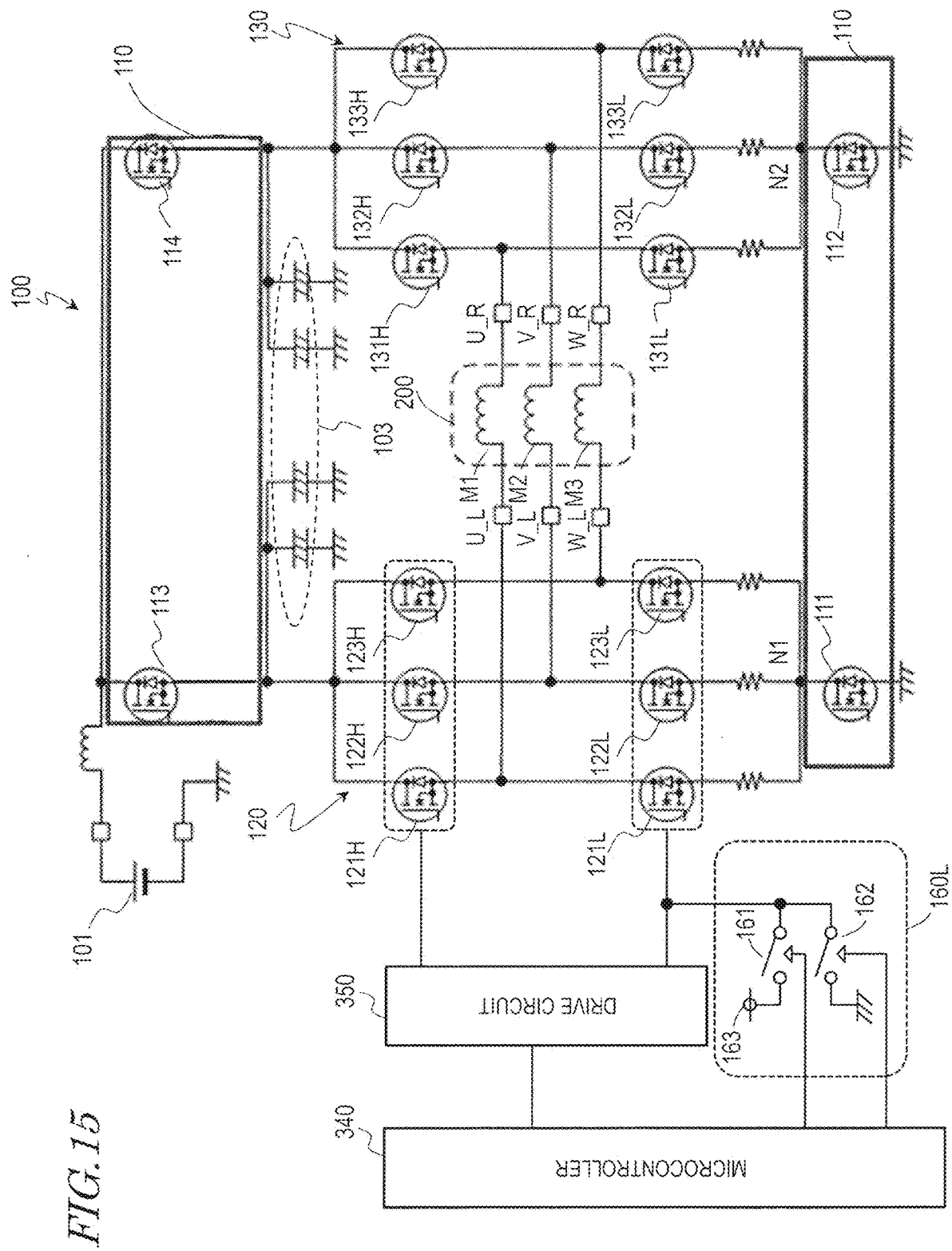
FIG. 15 is a circuit diagram schematically showing a power conversion device 100 including a sub-drive circuit 160L.

FIG. 15 schematically shows a power conversion device 100 including a sub-drive circuit 160L according to this embodiment. The sub-drive circuit 160L is coupled to the FETs 121L, 122L, and 123L.

In the control performed when the first inverter 120 is operating normally, a gate control signal is supplied from the drive circuit 350 to the FETs 121L, 122L, and 123L. When the first inverter 120 is not operating normally, the sub-drive circuit 160L may supply a gate control signal to the FETs 121L, 122L, and 123L so that a neutral point is formed at the node N1. The voltage of the gate control signal to the FETs 121L, 122L, and 123L that is output by the sub-drive circuit 160L is higher than the votage of the gate control signal output from the drive circuit 350. The higher gate voltage is generated by, for example, the booster circuit 370 (FIG. 5). The votage of the gate control signal output by the sub-drive circuit 160L is, for example, 24 V.

The sub-drive circuit 160L includes switching circuits 161 and 162. In the control performed when the first inverter 120 is operating normally, the switching circuits 161 and 162 are off.

In order to form a neutral point at the node N1 of the first inverter 120, the microcontroller 340 turns on the switching circuit 161. As a result, a voltage of a voltage supply 163 is supplied as a gate voltage through the switching circuit 161 to the FETs 121L, 122L, and 123L. The voltage of the voltage supply 163 is generated by the booster circuit 370. The voltage of the voltage supply 163 is, for example, set such that the gate-source voltages of the FETs 121L, 122L, and 123L are smaller than the breakdown voltages.

In another control that is different from the control for forming a neutral point, the first inverter 120 may be forced to stop operating. To do so, the microcontroller 340 turns on the switching circuit 162. As a result, the gates of the FETs 121L, 122L, and 123L are connected to the GND, and therefore, are turned off. For example, during the control for forming a neutral point, any additional failure may occur. In this case, if the switching circuit 162 is turned on, the FETs 121L, 122L, and 123L can be forcibly turned off. Note that, in the case where it is not necessary to forcibly turn off the FETs 121L, 122L, and 123L, the switching circuit 162 may be removed. In the case where the power conversion device 100 does not include the switching circuit 162, the first inverter 120 may be forced to stop operating by turning off the drive circuit 350 and the switching circuit 161.

Figure 16:
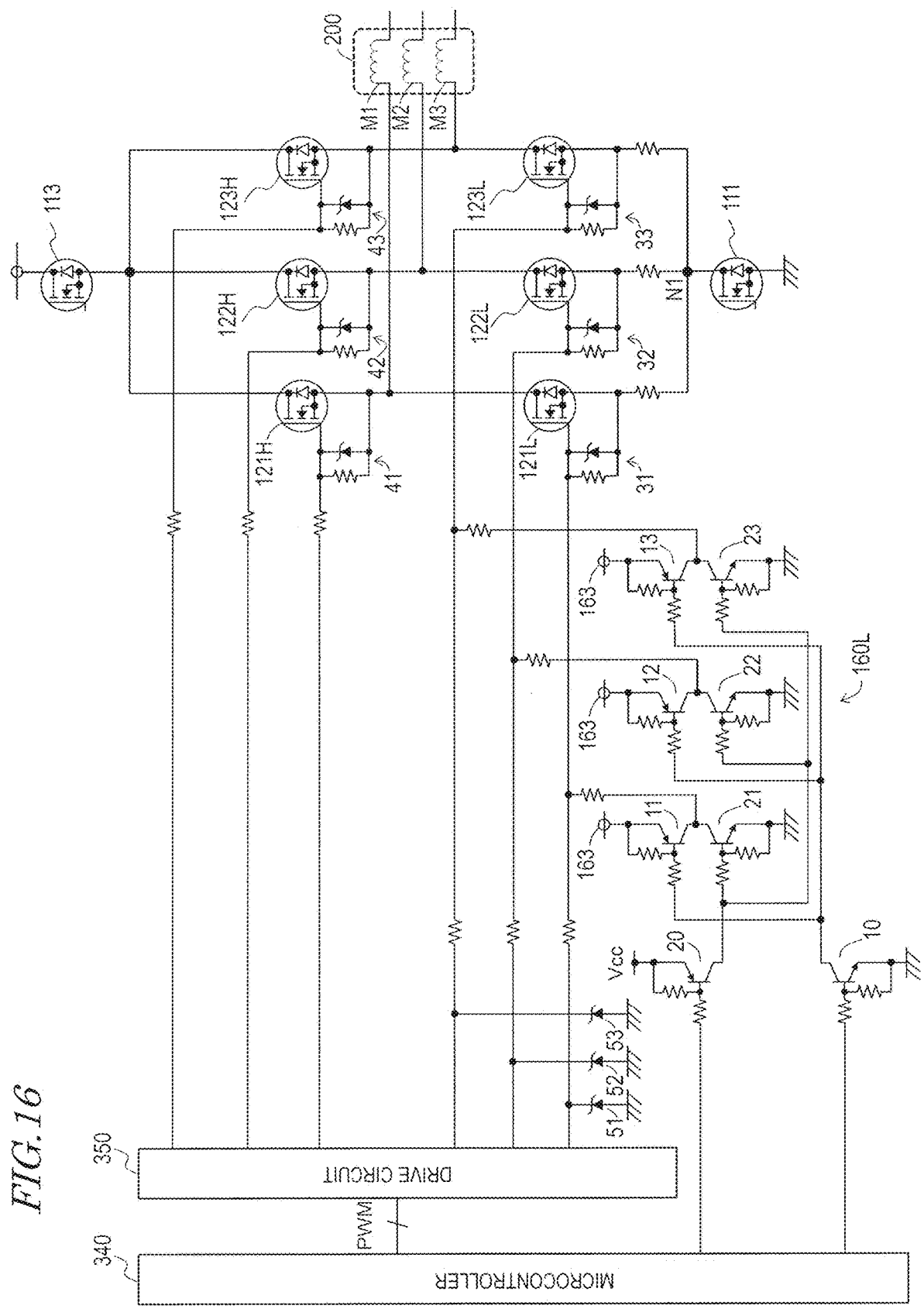
FIG. 16 is a circuit diagram schematically showing a circuit configuration of the sub-drive circuit 160L.

FIG. 16 schematically shows an example circuit configuration of the sub-drive circuit 160L. For ease of understanding of the sub-drive circuit 160L, the second inverter 130 is not shown in FIG. 16. In the example of FIG. 16, the sub-drive circuit 160L includes open-collector output type transistors. The switching circuit 161 (FIG. 15) includes switching elements 10, 11, 12, and 13. The switching circuit 162 (FIG. 15) includes switching elements 20, 21, 22, and 23. The switching circuits 161 and 162 are each, for example, a push-pull circuit.

In the example of FIG. 16, the switching elements 11, 12, 13, and 20 are a PNP bipolar transistor. The switching elements 10, 21, 22, and 23 are an NPN bipolar transistor. In the description that follows, it is assumed that the switching elements 10, 11, 12, 13, 20, 21, 22, and 23 are a bipolar transistor, and may be referred to as "transistors."

The base of the transistor 10 is coupled to the microcontroller 340. The emitter of the transistor 10 is coupled to the GND. The collector of the transistor 10 is coupled to the bases of the transistors 11, 12, and 13.

The emitters of the transistors 11, 12, and 13 are coupled to the voltage supply 163. The collector of the transistor 11 is coupled to the gate of the FET 121L. The collector of the transistor 12 is coupled to the gate of the FET 122L. The collector of the transistor 13 is coupled to the gate of the FET 123L.

The base of the transistor 20 is coupled to the microcontroller 340. The emitter of the transistor 20 is coupled to a voltage supply Vcc. The collector of the transistor 20 is coupled to the bases of the transistors 21, 22, and 23.

The emitters of the transistors 21, 22, and 23 are coupled to the GND. The collector of the transistor 21 is coupled to the gate of the FET 121L. The collector of the transistor 22 is coupled to the gate of the FET 122L. The collector of the transistor 23 is coupled to the gate of the FET 123L.

Protection circuits 31, 32, and 33 in each of which a resistor and a diode are connected together in parallel are coupled between the gates and sources of the FETs 121L, 122L, and 123L, respectively. Protection circuits 41, 42, and 43 in each of which a resistor and a diode are connected together in parallel are coupled between the gates and sources of the FETs 121H, 122H, and 123H, respectively.

A protection circuit 51 is coupled between an output terminal (not shown) of the drive circuit 350 coupled to the gate of the FET 121L, and the GND. A protection circuit 52 is coupled between an output terminal (not shown) of the drive circuit 350 coupled to the gate of the FET 122L, and the GND. A protection circuit 53 is coupled between an output terminal (not shown) of the drive circuit 350 coupled to the gate of the FET 123L, and the GND.

In the control performed when the first inverter 120 is operating normally, the microcontroller 340 turns off the transistors 10 and 20. When the transistors 10 and 20 are turned off, the transistors 11, 12, 13, 21, 22, and 23 are turned off.

Next, an operation of forming a neutral point at the low-side node N1 will be described. In order to form a neutral point at the node N1, the microcontroller 340 sets the gate control signals output from the drive circuit 350 to the FETs 121L, 122L, and 123L to be off. At the same time, the microcontroller 340 turns on the transistor 10. When the transistor 10 is turned on, the bases of the transistors 11, 12, 13 go to the GND level, so that the transistors 11, 12, and 13 are turned on.

When the transistors 11, 12, 13 are turned on, the voltage of the voltage supply 163 is supplied as a gate control signal to the FETs 121L, 122L, and 123L. As a result, a gate voltage that is higher than when the first inverter 120 is operating normally can be supplied to the FETs 121L, 122L, and 123L. Even if such a higher gate voltage is used, so that the source potential is the same as the potential of the neutral point, a decrease in the gate-source voltage can be prevented or reduced. An increase in the source-drain resistance values of the FETs 121L, 122L, and 123L in the on-state can be prevented or reduced, and the FETs 121L, 122L, and 123L can be substantially prevented from being accidentally turned off.

The protection circuits 51, 52, and 53 substantially prevent a voltage that is higher than or equal to a breakdown voltage from being supplied to the output terminals of the drive circuit 350 coupled to the FETs 121L, 122L, and 123L. Here, the breakdown voltage is, for example, the breakdown voltage of a circuit element of the drive circuit 350 that outputs the gate control signals for the FETs 121L, 122L, and 123L in the control under normal conditions.

The protection circuits 51, 52, and 53 are, for example, a Zener diode. The protection circuits 51, 52, and 53 function when the voltage of a gate control signal output by the sub-drive circuit 160L is close to or higher than or equal to the breakdown voltage. For example, in the case where the breakdown voltage is 18 V, if the voltage of the gate control signal is higher than or equal to 17 V, the protection circuits 51, 52, and 53 function. As a result, voltages supplied to the output terminals of the drive circuit 350 coupled to the FETs 121L, 122L, and 123L can be limited to voltages smaller than the breakdown voltage. In this example, a gate voltage that is higher than when the first inverter 120 is operating normally is supplied to the FETs 121L, 122L, and 123L. Even if such a higher gate voltage accidentally goes to a voltage that is higher than or equal to the breakdown voltage, the protection circuits 51, 52, and 53 can protect the drive circuit 350.

Next, an operation of forcibly turning off the FETs 121L, 122L, and 123L will be described. In order to forcibly turn off the FETs 121L, 122L, and 123L, the microcontroller 340 turns on the transistor 20. When the transistor 20 is turned on, the bases of the transistors 21, 22, and 23 go to the level of the voltage supply Vcc, so that the transistors 21, 22, and 23 are turned on. When the transistors 21, 22, and 23 are turned on, the gates of the FETs 121L, 122L, and 123L go to the GND level. As a result, the FETs 121L, 122L, and 123L can be forcibly turned off.

Figure 17:
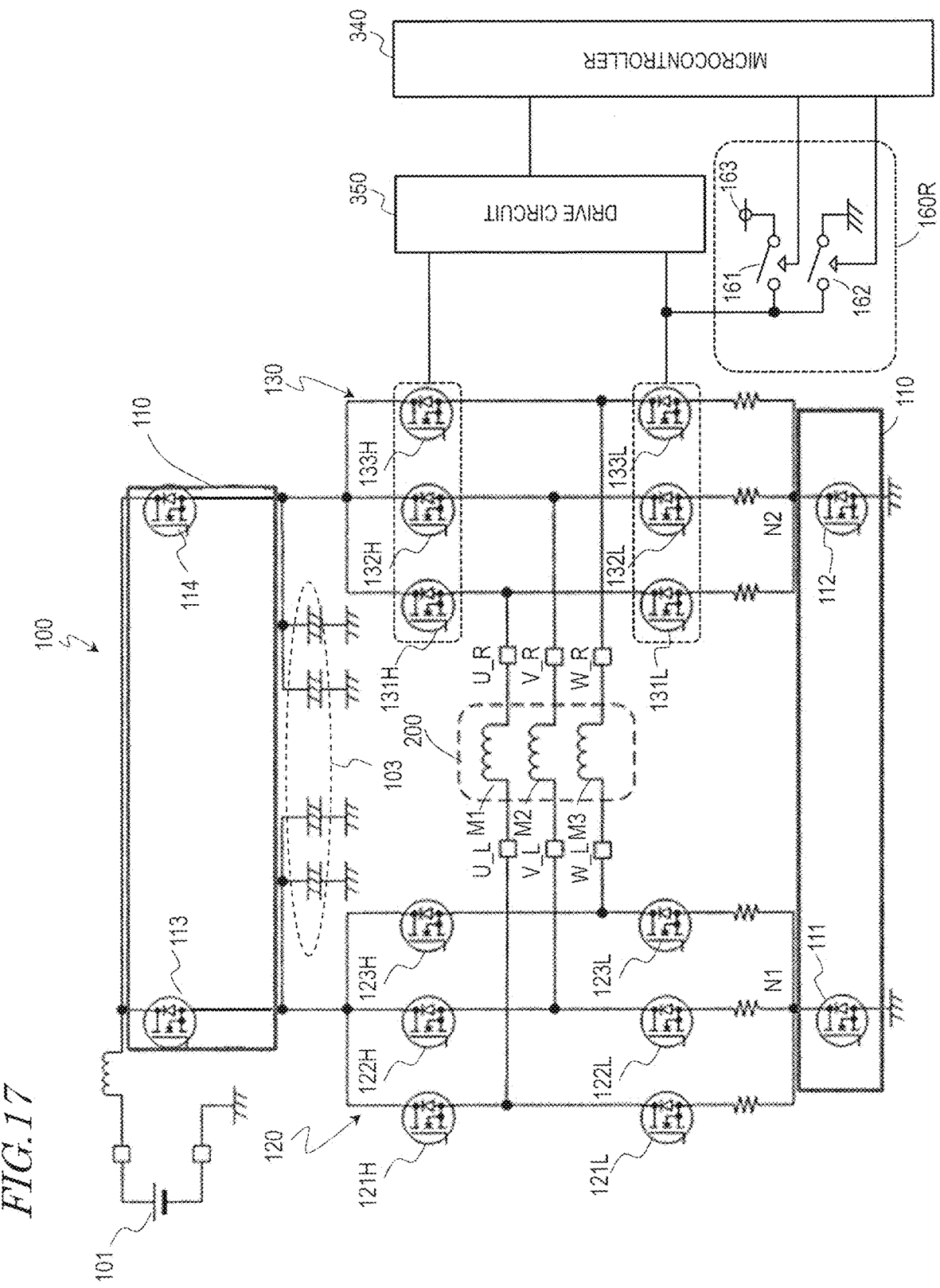
FIG. 17 is a circuit diagram schematically showing a power conversion device 100 including a sub-drive circuit 160R.

Note that a circuit similar to the sub-drive circuit 160L may be coupled to the second inverter 130. FIG. 17 schematically shows a power conversion device 100 including a sub-drive circuit 160R according to this embodiment. In the foregoing, the sub-drive circuit 160L is coupled to the FETs 121L, 122L, and 123L of the first inverter 120. In contrast to this, the sub-drive circuit 160R is coupled to the FETs 131L, 132L, and 133L of the second inverter 130. The other portion of the circuit configuration of the sub-drive circuit 160R is similar to that of the sub-drive circuit 160L which has been described above with reference to FIGS. 15 and 16.

In the event of an open-circuit or short-circuit failure in at least one of the FETs 121H, 122H, and 123H of the first inverter 120, a neutral point is formed at the low-side node N1 as described above. Similarly, in the event of an open-circuit or short-circuit failure in at least one of the FET 131H, 132H, 133H of the second inverter 130, a neutral point is formed at the low-side node N2. In this case, by using the sub-drive circuit 160R, the voltages of gate control signals for turning on the FETs 131L, 132L, and 133L is set to be higher than when the second inverter 130 is operating normally. As a result, an increase in the source-drain resistance values of the FETs 131L, 132L, and 133L in the on-state can be prevented or reduced, and the FETs 131L, 132L, and 133L can be substantially prevented from accidentally being turned off.

The power conversion device 100 may include either both or only one of the sub-drive circuits 160L and 160R.

In the above examples, it is assumed that the switching circuits 161 and 162 include transistors. Alternatively, the switching circuits 161 and 162 may include an analog switch. For example, the switching circuits 161 and 162 may include a single-throw switch.

Next, another example sub-drive circuit will be described.

Figure 18:
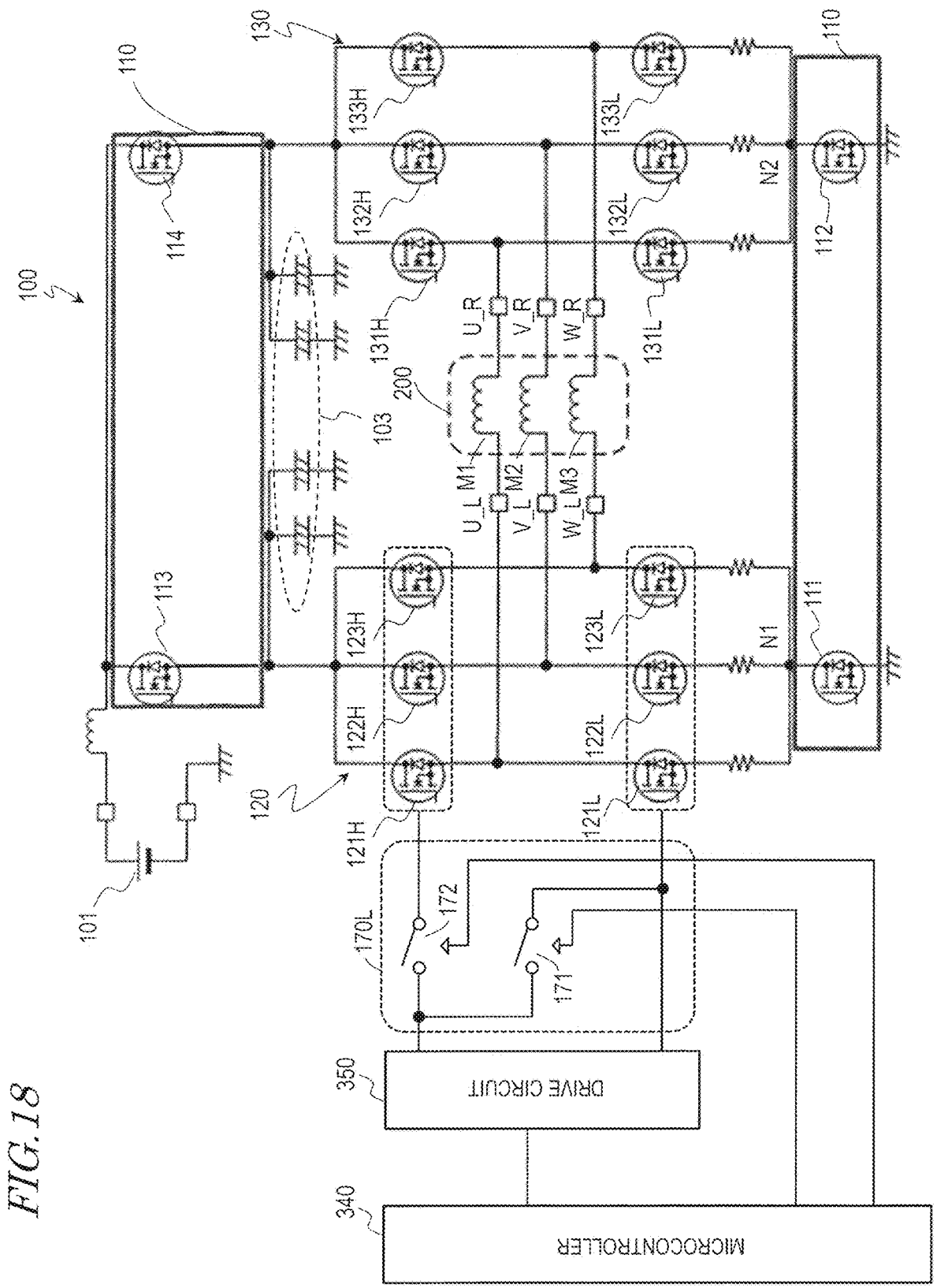
FIG. 18 is a circuit diagram schematically showing a power conversion device 100 including a sub-drive circuit 170L.

FIG. 18 schematically shows a power conversion device 100 including a sub-drive circuit 170L according to this embodiment. The sub-drive circuit 170L is coupled to the FETs 121H, 122H, 123H, 121L, 122L, and 123L.

In the event of an open-circuit or short-circuit failure in at least one of the FETs 121H, 122H, and 123H, a neutral point is formed at the node N1. As described above, in the control performed when the first inverter 120 is operating normally, the voltage of gate control signals for turning on the FETs 121H, 122H, and 123H are higher than or equal to the voltages of gate control signals for turning on the FETs 121L, 122L, and 123L. In this example, in order to form a neutral point at the node N1, the gate control signals having a high voltage for the FETs 121H, 122H, and 123H are supplied to the FETs 121L, 122L, and 123L. In this example, the drive circuit 350 is operated by the charge pump technology. The drive circuit 350 generates a gate control signal using the potential of the GND as a reference potential instead of generating a gate control signal using the source potential as a reference potential.

The sub-drive circuit 170L includes switching circuits 171 and 172. In order to form a neutral point at the node N1 of the first inverter 120, the microcontroller 340 turns off the switching circuit 172, and turns on the switching circuit 171. As a result, the gate control signals having a high voltage for the FETs 121H, 122H, and 123H that are output from the drive circuit 350 are not supplied to the FETs 121H, 122H, and 123H, and are supplied to the FETs 121L, 122L, and 123L.

Figure 19:
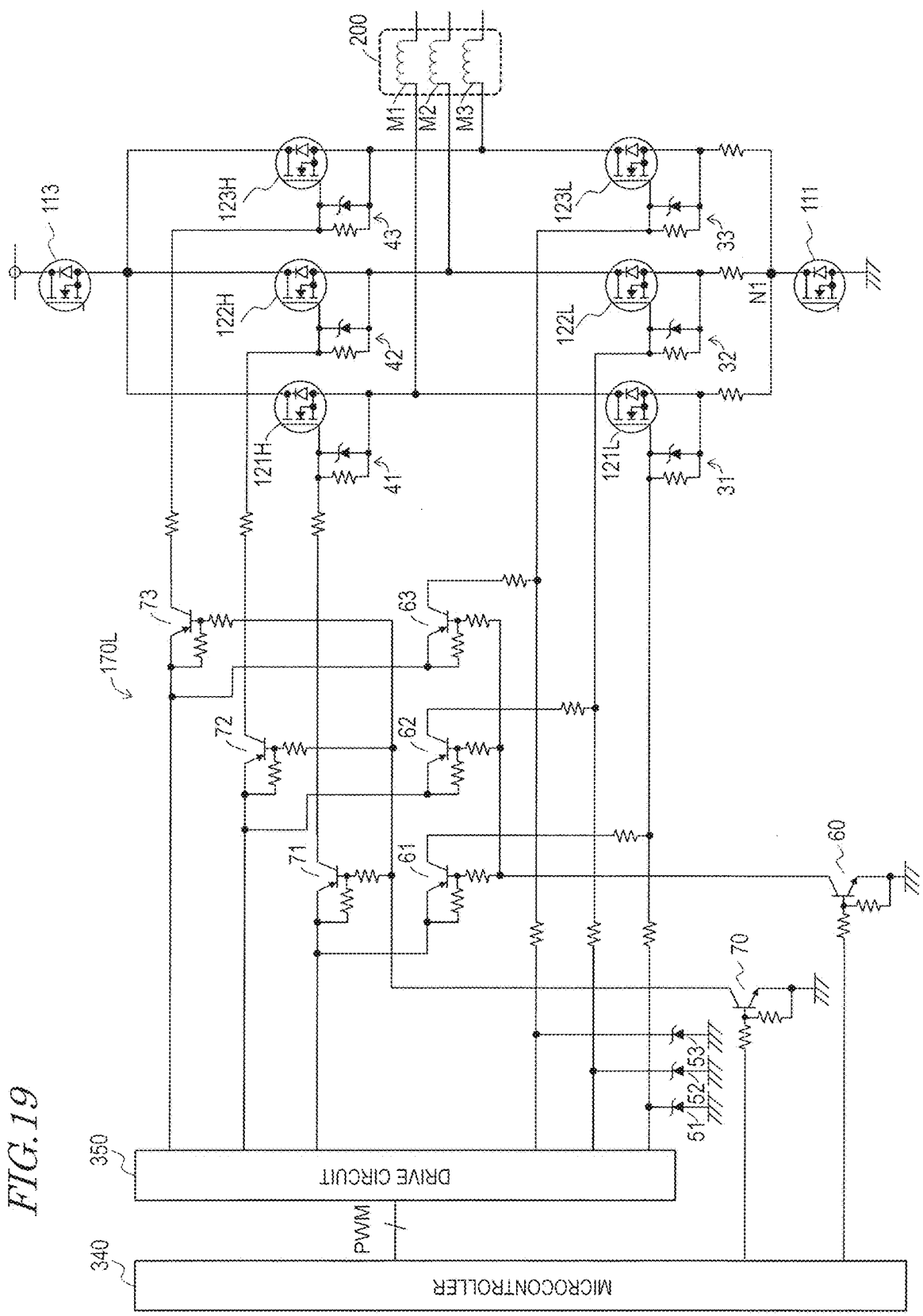
FIG. 19 is a circuit diagram schematically showing of a circuit configuration of the sub-drive circuit 170L.

FIG. 19 schematically shows an example circuit configuration of the sub-drive circuit 170L. For ease of understanding of the sub-drive circuit 170L, the second inverter 130 is not shown in FIG. 19. In the example of FIG. 19, the sub-drive circuit 170L includes open-collector output type transistors. The switching circuit 171 (FIG. 18) includes switching elements 60, 61, 62, and 63. The switching circuit 172 (FIG. 18) includes switching elements 70, 71, 72, and 73. The switching circuits 171 and 172 are each, for example, a push-pull circuit.

In the example of FIG. 19, the switching elements 60 and 70 are an NPN bipolar transistor. The switching elements 61, 62, 63, 71, 72, and 73 are a PNP bipolar transistor. In the description that follows, it is assumed that the switching elements 60, 61, 62, 63, 70, 71, 72, and 73 are a bipolar transistor, and may be referred to as "transistors."

The base of the transistor 60 is coupled to the microcontroller 340. The emitter of the transistor 60 is coupled to the GND. The collector of the transistor 60 is coupled to the bases of the transistors 61, 62, and 63.

The emitter of the transistor 61 is coupled to a point of a control line for the gate of the FET 121H that is closer to the drive circuit 350. For example, the emitter of the transistor 61 may be coupled to an output terminal (not shown) of the drive circuit 350 through which a gate control signal for the FET 121H is output.

The emitter of the transistor 62 is coupled to a point of a control line for the gate of the FET 122H that is closer to the drive circuit 350. For example, the emitter of the transistor 62 may be coupled to an output terminal (not shown) of the drive circuit 350 through which a gate control signal for the FET 122H is output.

The emitter of the transistor 63 is coupled to a point of a control line for the gate of the FET 123H that is closer to the drive circuit 350. For example, the emitter of the transistor 63 may be coupled to an output terminal (not shown) of the drive circuit 350 through which a gate control signal for the FET 123H is output.

The collector of the transistor 61 is coupled to the gate of the FET 121L. The collector of the transistor 62 is coupled to the gate of the FET 122L. The collector of the transistor 63 is coupled to the gate of the FET 123L.

The base of the transistor 70 is coupled to the microcontroller 340. The emitter of the transistor 70 is coupled to the GND. The collector of the transistor 70 is coupled to the bases of the transistors 71, 72, and 73.

The collector of the transistor 71 is coupled to the gate of the FET 121H. The collector of the transistor 72 is coupled to the gate of the FET 122H. The collector of the transistor 73 is coupled to the gate of the FET 123H.

The emitter of the transistor 71 is coupled to the control line for the gate of the FET 121H. The emitter of the transistor 71 is coupled to a point of the control line that is closer to the FET 121H than is the coupling point of the control line to the emitter of the transistor 61.

The emitter of the transistor 72 is coupled to the control line for the gate of the FET 122H. The emitter of the transistor 72 is coupled to a point of the control line that is closer to the FET 122H than is the coupling point of the control line to the emitter of the transistor 62.

The emitter of the transistor 73 is coupled to the control line for the gate of the FET 123H. The emitter of the transistor 73 is coupled to a point of the control line that is closer to the FET 123H than is the coupling point of the control line to the emitter of the transistor 63.

A protection circuit 51 is coupled between an output terminal (not shown) of the drive circuit 350 coupled to the gate of the FET 121L, and the GND. A protection circuit 52 is coupled between an output terminal (not shown) of the drive circuit 350 coupled to the gate of the FET 122L, and the GND. A protection circuit 53 is coupled between an output terminal (not shown) of the drive circuit 350 coupled to the gate of the FET 123L, and the GND. As a result, even in the case where high gate voltages are supplied to the FETs 121L, 122L, and 123L, the voltages applied to the output terminals of the drive circuit 350 can be limited to voltages lower than the breakdown voltages.

In the control performed when the first inverter 120 is operating normally, the microcontroller 340 turns on the transistor 70. When the transistor 70 is turned on, the bases of the transistors 71, 72, and 73 go to the GND level, so that the transistors 71, 72, and 73 are turned on. In addition, the microcontroller 340 turns off the transistor 60. When the transistor 60 is turned off, the transistors 61, 62, and 63 are turned off. As a result, gate control signals for the FETs 121H, 122H, and 123H that are output from the drive circuit 350 are supplied to the FETs 121H, 122H, and 123H.

Next, an operation of forming a neutral point at the low-side node N1 will be described. In order to form a neutral point at the node N1, the microcontroller 340 turns off the transistor 70. When the transistor 70 is turned off, the transistors 71, 72, and 73 are turned off. At the same time, the microcontroller 340 turns on the transistor 60. When the transistor 60 is turned on, the bases of the transistors 61, 62, and 63 go to the GND level, so that the transistors 61, 62, and 63 are turned on.

When the transistor 61 is turned on, the gate control signal for the FET 121H that is output from the drive circuit 350 is supplied through the transistor 61 to the FET 121L. When the transistor 62 is turned on, the gate control signal for the FET 122H that is output from the drive circuit 350 is supplied through the transistor 62 to the FET 122L. When the transistor 63 is turned on, the gate control signal for the FET 123H that is output from the drive circuit 350 is supplied through the transistor 63 to the FET 123L.

As a result, gate voltages higher than when the first inverter 120 is operating normally can be supplied to the FETs 121L, 122L, and 123L. Even when such higher gate voltages are used, so that the source potential is the same as the potential of the neutral point, a decrease in the gate-source voltage can be prevented or reduced. An increase in the source-drain resistance values of the FETs 121L, 122L, and 123L in the on-state can be prevented or reduced, and the FETs 121L, 122L, and 123L can be substantially prevented from being accidentally turned off.

Note that the first inverter 120 may be forced to stop operating. To do so, the switching circuits 171 and 172 are turned off, and the gate control signals for the FETs 121L, 122L, and 123L that are output by the drive circuit 350 are set to be off. As a result, the first inverter 120 can be forced to stop operating.

Figure 20:
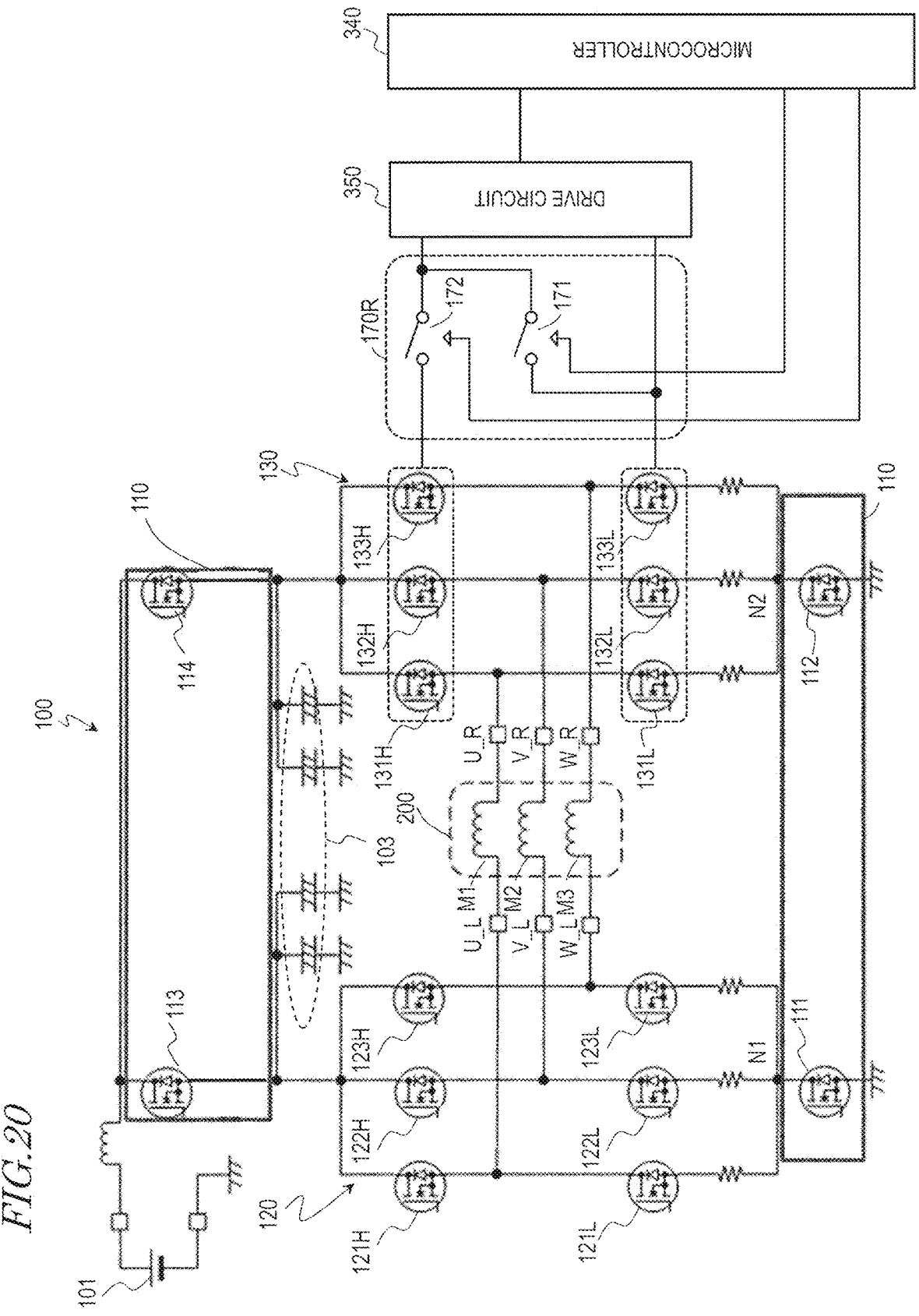
FIG. 20 is a circuit diagram schematically showing a power conversion device 100 including a sub-drive circuit 170R.

A circuit similar to the sub-drive circuit 170L may be coupled to the second inverter 130. FIG. 20 schematically shows a power conversion device 100 including a sub-drive circuit 170R according to this embodiment. In the foregoing, the sub-drive circuit 170L is coupled to the FETs 121H, 122H, 123H, 121L, 122L, and 123L of the first inverter 120. In contrast to this, the sub-drive circuit 170R is coupled to the FETs 131H, 132H, 133H, 131L, 132L, and 133L of the second inverter 130. The other portion of the circuit configuration of the sub-drive circuit 170R is similar to that of the sub-drive circuit 170L which has been described above with reference to FIGS. 18 and 19.

In the event of an open-circuit or short-circuit failure in at least one of the FETs 121H, 122H, and 123H of the first inverter 120, a neutral point is formed at the low-side node N1 as described above. Similarly, in the event of an open-circuit or short-circuit failure in at least one of the FET 131H, 132H, 133H of the second inverter 130, a neutral point is formed at the low-side node N2. In this case, by using the sub-drive circuit 170R, the voltages of gate control signals for turning on the FETs 131L, 132L, and 133L are set to be higher than when the second inverter 130 is operating normally. As a result, an increase in the source-drain resistance values of the FETs 131L, 132L, and 133L in the on-state can be prevented or reduced, and the FETs 131L, 132L, and 133L can be substantially prevented from accidentally being turned off.

The power conversion device 100 may include either both or only one of the sub-drive circuits 170L and 170R.

In the above examples, it is assumed that the switching circuits 171 and 172 include transistors. Alternatively, the switching circuits 171 and 172 may include an analog switch. For example, the switching circuits 171 and 172 may include a single-throw switch. Alternatively, for example, the switching circuits 171 and 172 may include a double-throw switch. In order to prevent or reduce an influence on the PWM control, an analog switch having a small on-resistance (e.g., from several tens of milliohms to several ohms) may be used on the high side.

Second Embodiment

Vehicles such as automobiles are typically equipped with an electric power steering device. The electric power steering device generates an assistive torque that is added to the steering torque of a steering system that is generated by a driver turning a steering wheel. The assistive torque is generated by an assistive torque mechanism, and can reduce a driver's burden of turning a steering wheel. For example, the assistive torque mechanism includes a steering torque sensor, an ECU, a motor, and a deceleration mechanism, etc. The steering torque sensor detects a steering torque in the steering system. The ECU generates a drive signal on the basis of a detection signal from the steering torque sensor. The motor generates an assistive torque depending on the steering torque on the basis of the motor drive signal. The assistive torque is transferred through the deceleration mechanism to the steering system.

Figure 21:
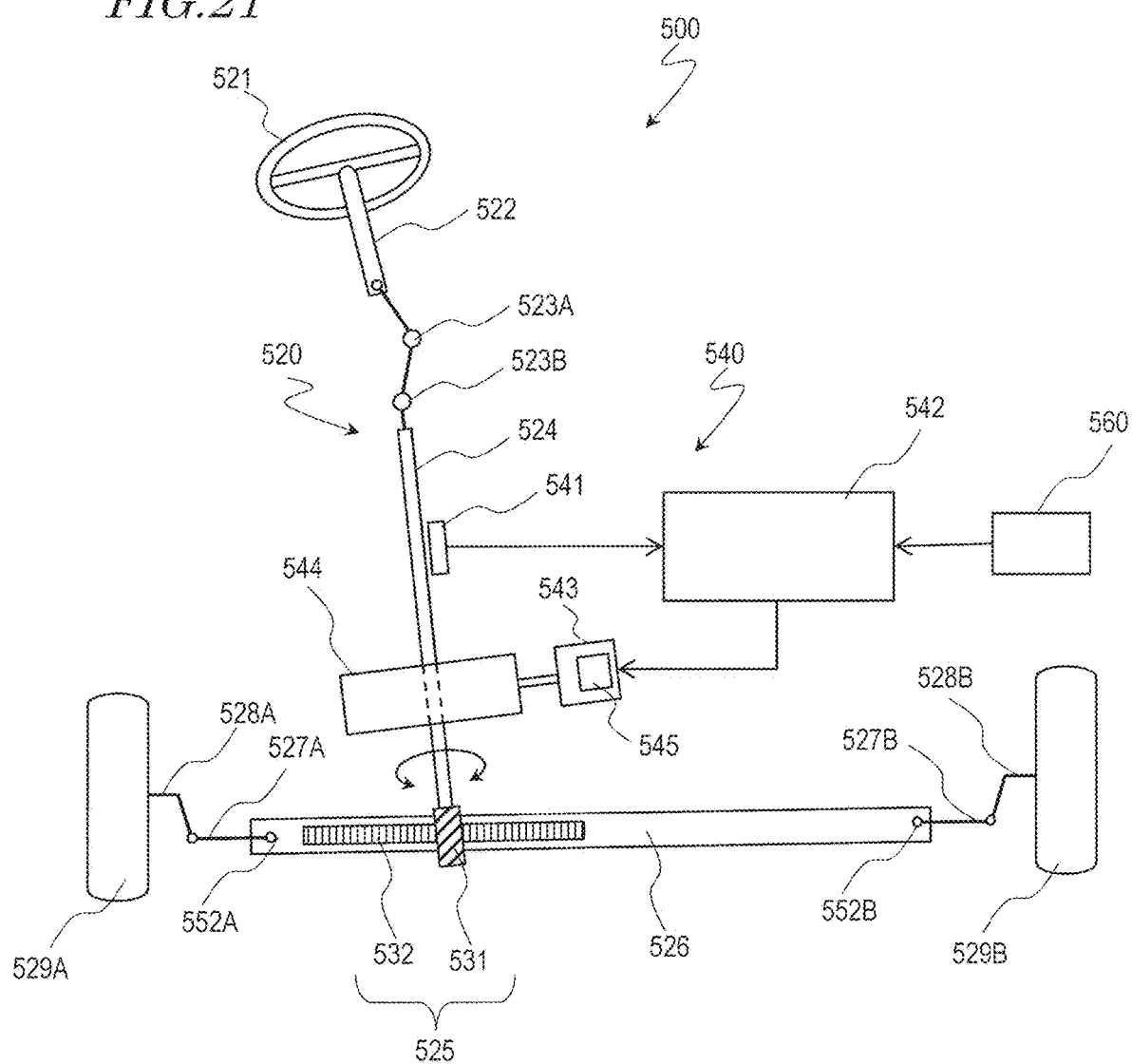
FIG. 21 is a schematic diagram showing a typical configuration of an electric power steering device 500 according to an illustrative second embodiment.

The motor drive unit 400 of the present disclosure may be used in the electric power steering device. FIG. 21 schematically shows a typical configuration of an electric power steering device 500 according to this embodiment. The electric power steering device 500 includes a steering system 520 and an assistive torque mechanism 540.

The steering system 520 includes, for example, a steering wheel 521, a steering shaft 522 (also called a "steering column"), universal couplings 523A and 523B, a rotating shaft 524 (also called a "pinion shaft" or "input shaft"), a rack and pinion mechanism 525, a rack shaft 526, left and right ball joints 552A and 552B, tie rods 527A and 527B, knuckles 528A and 528B, and left and right steerable wheels (e.g., left and right front wheels) 529A and 529B. The steering wheel 521 is linked through the steering shaft 522 and the universal couplings 523A and 523B to the rotating shaft 524. The rotating shaft 524 is linked through the rack and pinion mechanism 525 to the rack shaft 526. The rack and pinion mechanism 525 has a pinion 531 provided on the rotating shaft 524, and a rack 532 provided on the rack shaft 526. A right end of the rack shaft 526 is linked to the right steerable wheel 529A through the ball joint 552A, the tie rod 527A, and the knuckle 528A in this order with the ball joint 552A being closest to the right end of the rack shaft 526. As with the right side, a left end of the rack shaft 526 is linked to the left steerable wheel 529B through the ball joint 552B, the tie rod 527B, and the knuckle 528B in this order with the ball joint 552B being closest to the left end of the rack shaft 526. Here, the right and left sides correspond to the right and left sides, respectively, of a driver sitting on a seat.

In the steering system 520, a steering torque is generated by a driver turning the steering wheel 521, and is transmitted through the rack and pinion mechanism 525 to the left and right steerable wheels 529A and 529B. As a result, the driver can control the left and right steerable wheels 529A and 529B.

The assistive torque mechanism 540 includes, for example, a steering torque sensor 541, an ECU 542, a motor 543, a deceleration mechanism 544, and a power conversion device 545. The assistive torque mechanism 540 applies an assistive torque to the steering system 520 including from the steering wheel 521 to the left and right steerable wheels 529A and 529B. Note that the assistive torque may also be called an "additional torque."

As the ECU 542, the control circuit 300 of the first embodiment can be used. As the power conversion device 545, the power conversion device 100 of the first embodiment can be used. The motor 543 is equivalent to the motor 200 of the first embodiment. As a mechanically and electronically integrated unit including the ECU 542, the motor 543, and the power conversion device 545, the motor drive unit 400 of the first embodiment may be used.

The steering torque sensor 541 detects a steering torque that is applied to the steering system 520 using the steering wheel 521. The ECU 542 generates a drive signal for driving the motor 543 on the basis of a detection signal (hereinafter referred to as a "torque signal") from the steering torque sensor 541. The motor 543 generates an assistive torque depending on the steering torque on the basis of the drive signal. The assistive torque is transmitted through the deceleration mechanism 544 to the rotating shaft 524 of the steering system 520. The deceleration mechanism 544 is, for example, a worm gear mechanism. The assistive torque is further transmitted from the rotating shaft 524 to the rack and pinion mechanism 525.

The electric power steering device 500 may be categorized into the pinion assist type, rack assist type, column assist type, etc., according to a portion of the steering system 520 to which the assistive torque is added. FIG. 21 illustrates the electric power steering device 500 of the pinion assist type. Note that the electric power steering device 500 may be of the rack assist type, column assist type, etc.

In addition to the torque signal, a vehicle speed signal may be input to the ECU 542, for example. A piece of external equipment 560 may, for example, be a vehicle speed sensor. Alternatively, the external equipment 560 may, for example, be another ECU that can communicate with the ECU 542 over an in-vehicle network, such as a controller area network (CAN). The microcontroller of the ECU 542 can perform vector control or PWM control on the motor 543 on the basis of the torque signal and the vehicle speed signal, etc.

The ECU 542 determines a desired current value on the basis of at least the torque signal. The ECU 542 may determine the desired current value, taking into account the vehicle speed signal detected by the vehicle speed sensor, and in addition, a rotor rotation signal detected by an angle sensor. The ECU 542 can control a drive signal, i.e. a drive current, for the motor 543 such that an actual current value detected by a current sensor (not shown) is equal to the desired current value.

The electric power steering device 500 can control the left and right steerable wheels 529A and 529B through the rack shaft 526 using a composite torque obtained by adding the assistive torque of the motor 543 to a driver's steering torque. In particular, if the motor drive unit 400 of the present disclosure is applied to the above mechanically and electronically integrated unit, an electric power steering device including a motor drive unit is provided in which the quality of parts can be improved, and suitable current control can be performed under both normal and abnormal conditions.

INDUSTRIAL APPLICABILITY

The embodiments of the present disclosure are applicable to a wide variety of devices including various motors, such as vacuum cleaners, dryers, ceiling fans, washing machines, refrigerators, and electric power steering devices.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A power conversion device for converting power that is to be supplied to an electric motor having n phase windings, n being an integer of three or more, the device comprising:
   a first inverter to which a first end of each phase winding of the electric motor is coupled;
   a second inverter to which a second end of each phase winding is coupled; and
   a switch circuit comprising:
      a first switch element structured to switch between connection and disconnection of the first inverter and ground;
      a second switch element structured to switch between connection and disconnection of the second inverter and ground;
      a third switch element structured to switch between connection and disconnection of the first inverter and a power supply; and
      a fourth switch element structured to switch between connection and disconnection of the second inverter and the power supply,
   wherein the first and second inverters each comprise a bridge circuit comprising n legs each comprising a low-side switching element and a high-side switching element,
   the power conversion device further comprises a drive circuit structured to, under a failure in one of the high-side switching elements of the first inverter, supply a control signal for turning on the n low-side switching elements to the n low-side switching elements, and
      a voltage of the control signal of the drive circuit supplied to the n low-side switching elements is greater than a voltage of a control signal of the drive circuit for turning on the n low-side switching elements when the first inverter is operating normally.

2. The power conversion device of claim 1, wherein
   the third switch element is structured such that, when the first inverter is not operating normally, the third switch element disconnects the first inverter from the power supply;
   the first inverter is structured such that, when the first inverter is not operating normally, a neutral point for the n phase windings is formed in the first inverter.

3. The power conversion device of claim 1, wherein
   the power conversion device is structured such that, under an open-circuit failure in the third switch element, the second and fourth switch elements are turned on, the first switch element is turned off, all the n high-side switching elements in the bridge circuit of the first inverter are turned off, and all the n low-side switching elements in the bridge circuit of the first inverter are turned on.

4. The power conversion device of claim 1, wherein
   the power conversion device is structured such that, under an open-circuit failure in the third switch element, the second and fourth switch elements are turned on, all the n high-side switching elements in the bridge circuit of the first inverter are turned on, and all the n low-side switching elements in the bridge circuit of the first inverter are turned off.

5. The power conversion device of claim 1, wherein
   the power conversion device is structured such that, under an open-circuit failure in the third switch element, the second and fourth switch elements are turned on, the first switch element is turned off, at least one of the n high-side switching elements in the bridge circuit of the first inverter is turned on, and all the n low-side switching elements in the bridge circuit of the first inverter are turned on.

6. The power conversion device of claim 1, wherein
   the power conversion device is structured such that, under a short-circuit failure in the third switch element, the second and fourth switch elements are turned on, the first switch element is turned off, all the n high-side switching elements in the bridge circuit of the first inverter are turned off, and all the n low-side switching elements in the bridge circuit of the first inverter are turned on.

7. The power conversion device of claim 1, wherein
   the power conversion device is structured such that, under an open-circuit failure in the first switch element, the second and fourth switch elements are turned on, the third switch element is turned off, all the n high-side switching elements in the bridge circuit of the first inverter are turned on, and all the n low-side switching elements in the bridge circuit of the first inverter are turned off.

8. The power conversion device of claim 1, wherein
   the power conversion device is structured such that, under an open-circuit failure in the first switch element, the second and fourth switch elements are turned on, the third switch element is turned off, all the n high-side switching elements in the bridge circuit of the first inverter are turned on, and at least one of the n low-side switching elements in the bridge circuit of the first inverter is turned on.

9. The power conversion device of claim 1, wherein
   the power conversion device is structured such that, under a short-circuit failure in the first switch element, the second and fourth switch elements are turned on, the third switch element is turned off, all the n high-side switching elements in the bridge circuit of the first inverter are turned on, and all the n low-side switching elements in the bridge circuit of the first inverter are turned off.

10. The power conversion device of claim 1, wherein
    the power conversion device is structured such that, when the first inverter is operating normally, a voltage of a first control signal for turning on the n high-side switching elements is greater than a voltage of a second control signal for turning on the n low-side switching elements, and
    the power conversion device is structured such that, under a failure in one of the high-side switching elements of the first inverter, the drive circuit supplies the first control signal to the n low-side switching elements.

11. The power conversion device of claim 1, wherein
    the drive circuit includes an open-collector output type transistor.

12. A motor drive unit comprising:
the electric motor;
the power conversion device of claim 1; and
a control circuit that controls the power conversion device.

13. An electric power steering device comprising:
the motor drive unit of claim 12.

14. A power conversion device for converting power that is to be supplied to an electric motor having n phase windings, n being an integer of three or more, the device comprising:
a first inverter to which a first end of each phase winding of the electric motor is coupled;
a second inverter to which a second end of each phase winding is coupled; and
a switch circuit comprising:
   a first switch element structured to switch between connection and disconnection of the first inverter and ground;
   a second switch element structured to switch between connection and disconnection of the second inverter and ground;
   a third switch element structured to switch between connection and disconnection of the first inverter and a power supply; and
   a fourth switch element structured to switch between connection and disconnection of the second inverter and the power supply,
wherein the first and second inverters each comprise a bridge circuit comprising n legs each comprising a low-side switching element and a high-side switching element,
the power conversion device further comprising:
   a first drive circuit structured to, when the first inverter is operating normally, supply a first control signal for turning on the n low-side switching elements, to the n low-side switching elements; and
   a second drive circuit structured to, under a failure in one of the high-side switching elements of the first inverter, supply a second control signal for turning on the n low-side switching elements, to the n low-side switching elements, a voltage of the second control signal being greater than a voltage of the first control signal.

15. The power conversion device of claim 14, wherein the second drive circuit comprises an open-collector output type transistor.

16. The power conversion device of claim 14, further comprising:
a protection circuit structured to, when the second drive circuit outputs the second control signal, prevent a voltage having at least a predetermined value from being supplied to the first drive circuit.

17. A motor drive unit comprising:
the electric motor;
the power conversion device of claim 14; and
a control circuit that controls the power conversion device.

18. The power conversion device of claim 16, wherein the protection circuit comprises a Zener diode.

19. An electric power steering device comprising:
the motor drive unit of claim 17.

* * * * *